United States Patent
Kim et al.

(10) Patent No.: US 9,356,680 B2
(45) Date of Patent: May 31, 2016

(54) METHOD OF TRANSCEIVING SIGNAL AT RELAY NODE IN WIRELESS COMMUNICATION SYSTEM AND APPARATUS THEREOF

(75) Inventors: Hak Seong Kim, Anyang-si (KR); Han Byul Seo, Anyang-si (KR); Ki Jun Kim, Anyang-si (KR)

(73) Assignee: LG Electronics Inc., Seoul (KR)

( * ) Notice: Subject to any disclaimer, the term of this patent is extended or adjusted under 35 U.S.C. 154(b) by 335 days.

(21) Appl. No.: 13/577,140

(22) PCT Filed: Mar. 10, 2011

(86) PCT No.: PCT/KR2011/001669
§ 371 (c)(1),
(2), (4) Date: Aug. 3, 2012

(87) PCT Pub. No.: WO2011/112015
PCT Pub. Date: Sep. 15, 2011

(65) Prior Publication Data
US 2013/0010676 A1    Jan. 10, 2013

Related U.S. Application Data

(60) Provisional application No. 61/313,093, filed on Mar. 11, 2010.

(51) Int. Cl.
*H04W 88/04* (2009.01)
*H04B 7/155* (2006.01)

(52) U.S. Cl.
CPC ..................................... *H04B 7/155* (2013.01)

(58) Field of Classification Search
CPC ..... H04W 72/1263; H04W 88/04; H04B 1/56
USPC .......................................... 370/278, 280, 315
See application file for complete search history.

(56) References Cited

U.S. PATENT DOCUMENTS

| | | | |
|---|---|---|---|
| 2008/0227461 A1* | 9/2008 | Dayal et al. | 455/452.2 |
| 2010/0272006 A1* | 10/2010 | Bertrand et al. | 370/315 |
| 2010/0281323 A1* | 11/2010 | Wang et al. | 714/748 |
| 2011/0243066 A1* | 10/2011 | Nayeb Nazar et al. | 370/328 |
| 2011/0249611 A1* | 10/2011 | Khandekar et al. | 370/315 |
| 2012/0002591 A1* | 1/2012 | Noh et al. | 370/315 |

OTHER PUBLICATIONS

Girici, "Joint power, subcarrier and subframe allocation in Multihop relay networks," International Journal of Communication Systems, vol. 22, 2009 (published online on Jan. 28, 2009 in Wiley InterScience (www.interscience.wiley.com)), pp. 835-855.
Peters et al., "The Future of WiMAX: Multihop Relaying with IEEE 802.16j," IEEE Standards in Communications and Networking, IEEE Communications Magazine, Jan. 2009, pp. 104-111.
Sydir et al., "An Evolved Cellular System Architecture Incorporating Relay Stations," WiMAX Update, IEEE Communications Magazine, Jun. 2009, pp. 115-121.

* cited by examiner

*Primary Examiner* — Andrew Chriss
*Assistant Examiner* — Peter Mak
(74) *Attorney, Agent, or Firm* — Birch, Stewart, Kolasch & Birch, LLP

(57) ABSTRACT

A method for allowing a relay node (RN) to transmit and receive in a wireless communication system is disclosed. A method for transmitting and receiving a signal at a relay node in a wireless communication system includes transmitting and receiving a relay-User Equipment (UE) link signal through an access subframe, switching a communication link from a relay-UE link to a relay-base station (BS) link during a predetermined time, and transmitting and receiving a relay?BS link signal through a backhaul subframe. A timing edge of the access subframe is located ahead of a timing edge of an uplink subframe of the backhaul subframe by an offset value.

10 Claims, 18 Drawing Sheets

(a) contol - plane protocol stack (b) user - plane protocol stack (a)  (b)  (c)  (d)

METHOD OF TRANSCEIVING SIGNAL AT RELAY NODE IN WIRELESS COMMUNICATION SYSTEM AND APPARATUS THEREOF

CROSS REFERENCE TO RELATED APPLICATIONS

This application is the National Phase of PCT/KR2011/001669 filed on Mar. 10, 2011, which claims priority under 35 U.S.C. 119(e) to U.S. Provisional Application No. 61/313,093 filed on Mar. 11, 2010, all of which are hereby expressly incorporated by reference into the present application.

TECHNICAL FIELD

The present invention relates to a wireless communication system, and more particularly to a method and apparatus for transmitting and receiving signals at a relay node of a wireless communication system.

BACKGROUND ART

As a representative example of a wireless communication system of the present invention, a 3rd Generation Partnership Project Long Term Evolution (3GPP LTE) communication system will hereinafter be described in detail.

FIG. 1 is a conceptual diagram illustrating an Evolved Universal Mobile Telecommunications System (E-UMTS) network structure as an exemplary mobile communication system. In particular, the Enhanced Universal Mobile Telecommunications System (E-UMTS) has evolved from a legacy UMTS system, and basic standardization thereof is now being conducted by the 3rd Generation Partnership Project (3GPP). E-UMTS may also be referred to as Long Term Evolution (LTE). For details of the technical specifications of UMTS and E-UMTS, refer to Release 7 and Release 8 of "3rd Generation Partnership Project; Technical Specification Group Radio Access Network".

As shown in FIG. 1, the E-UMTS system is broadly made up of a User Equipment (UE) 120, base stations (or eNode-Bs) 110a and 110b, and an Access Gateway (AG) which is located at an end of a network (E-UTRAN) and is connected to an external network. Generally, an eNode-B can simultaneously transmit multiple data streams for a broadcast service, a multicast service and/or a unicast service.

Each eNode-B includes one or more cells. One cell of the eNode-B is set to use a bandwidth such as 1.25, 2.5, 5, 10, 15 or 20 MHz to provide a downlink or uplink transmission service to user equipments (UEs). Here, different cells may be set to use different bandwidths. The eNode-B controls transmission and reception of data for several UEs. In association with downlink (DL) data, the eNode-B transmits downlink (DL) scheduling information to a corresponding UE, so as to inform the corresponding UE of time/frequency domains where data is to be transmitted, coding information, data size information, Hybrid Automatic Repeat and reQuest (HARM)-related information, and the like. In association with uplink (UL) data, the eNode-B transmits UL scheduling information to the corresponding UE, so that it informs the corresponding UE of time/frequency domains capable of being used by the corresponding UE, coding information, data size information, HARQ-related information, and the like. An interface for transmission of user traffic or control traffic may be used between eNode-Bs. A Core Network (CN) may include an Access Gateway (AG) and a network node for user registration of the UE. The AG manages mobility of a UE on the basis of a Tracking Area (TA) composed of several cells.

Although wireless communication technology has been developed to LTE technology on the basis of WCDMA technology, the number of requests and expectations of users and enterprises is rapidly increasing. In addition, other wireless access technologies are being developed, such that there is needed a new or improved wireless access technology in order to remain competitive in the long run. For example, reduction in cost per bit, increase of service availability, adaptive frequency band utilization, a simple structure, an open-type interface, and appropriate power consumption of user equipment (UE) are needed for the new or improved wireless access technology.

DISCLOSURE OF INVENTION

Technical Problem

Accordingly, the present invention is directed to a method and apparatus for transmitting and receiving a signal at a relay node of a wireless communication system, that substantially obviate one or more problems due to limitations and disadvantages of the related art.

An object of the present invention devised to solve the problem lies on a method and apparatus for transmitting and receiving a signal at a relay node of a wireless communication system.

Solution to Problem

The object of the present invention can be achieved by providing a method for transmitting and receiving a signal at a relay node in a wireless communication system, the method including transmitting and receiving a relay-User Equipment (UE) link signal through an access subframe, switching a communication link from a relay-UE link to a relay-base station (BS) link during a predetermined time, and transmitting and receiving a relay?BS link signal through a backhaul subframe. A timing edge of the access subframe is located ahead of a timing edge of an uplink subframe of the backhaul subframe by an offset value.

In another aspect of the present invention, provided herein is a relay device for use in a wireless communication system including a transmission/reception (Tx/Rx) module for transmitting/receiving a relay-User Equipment (UE) link signal through an access subframe, or transmitting/receiving a relay-base station (BS) link signal through a backhaul subframe, and a processor for switching a communication link from a relay-UE link to a relay-base station (BS) link during a predetermined time, wherein a timing edge of the access subframe is located ahead of a timing edge of an uplink subframe of the backhaul subframe by an offset value.

The timing edge of the uplink subframe from among the access subframe may be identical to a timing edge of a downlink subframe. If a propagation delay is present in the relay-BS link, a downlink subframe edge of the backhaul subframe is delayed from a timing edge of a reference subframe by a symbol length corresponding to the propagation delay, and an uplink subframe edge of the backhaul subframe is located ahead of the timing edge of the reference subframe edge by the symbol length corresponding to the propagation delay.

The offset value may be set to a ½ symbol. A shortened Physical Uplink Control Channel (PUCCH) format in which one symbol is punctured in the uplink subframe from among the backhaul subframe may be used in the embodiment of the present invention.

Advantageous Effects of Invention

As can be seen from the embodiments of the present invention, a relay node can effectively communicate with a user equipment (UE) and a base station (BS) in a wireless communication system.

It will be appreciated by persons skilled in the art that that the effects that can be achieved with the present invention are not limited to what has been particularly described hereinabove and other advantages of the present invention will be more clearly understood from the following detailed description taken in conjunction with the accompanying drawings.

BRIEF DESCRIPTION OF DRAWINGS

The accompanying drawings, which are included to provide a further understanding of the invention, illustrate embodiments of the invention and together with the description serve to explain the principle of the invention.

In the drawings.

MODE FOR THE INVENTION

Reference will now be made in detail to the preferred embodiments of the present invention, examples of which are illustrated in the accompanying drawings. Wherever possible, the same reference numbers will be used throughout the drawings to refer to the same or like parts.

The above and other configurations, operations, and features of the present invention will be easily understood from the embodiments of the invention described below with reference to the accompanying drawings. The embodiments described below are examples wherein technical features of the invention are applied to a 3rd Generation Partnership Project (3GPP) system.

Although the embodiment of the present invention will be disclosed on the basis of an LTE system and an LTE-A system for convenience of description and better understanding of the present invention, it should be noted that the scope or spirit of the present invention is not limited only thereto and can be applied to other communication systems as necessary. In addition, although the embodiment of the present invention will be disclosed on the basis of an FDD scheme as an example, the scope or spirit of the embodiment of the present invention is not limited only thereto and can also be applied to H-FDD and TDD schemes as necessary.

Figure 1:
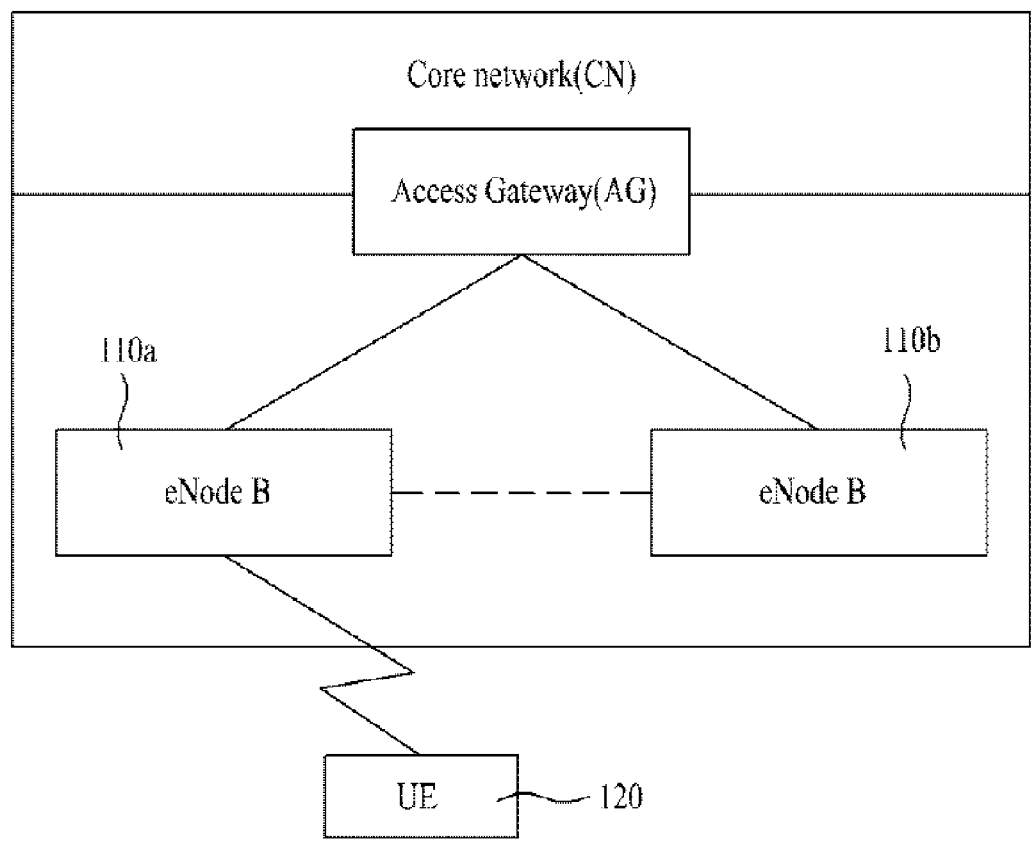
FIG. 1 is a conceptual diagram illustrating an Evolved Universal Mobile Telecommunications System (E-UMTS) network structure as an example of a wireless communication system.
Figure 2:
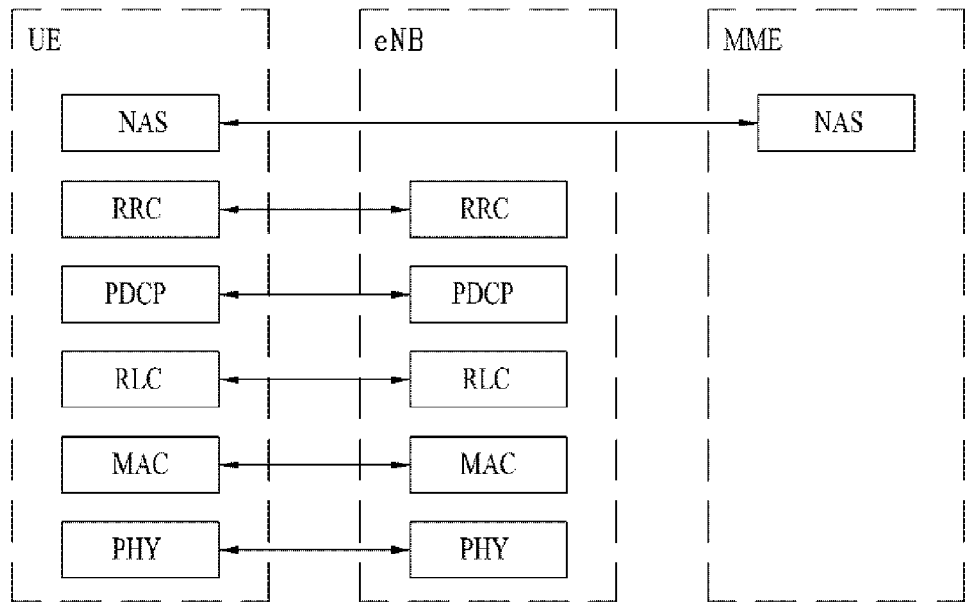
FIG. 2 illustrates a control plane and a user plane (U-Plane) of a radio interface protocol between a User Equipment (UE) and an E-UTRAN according to the 3GPP wireless access network standard.
Figure 2:
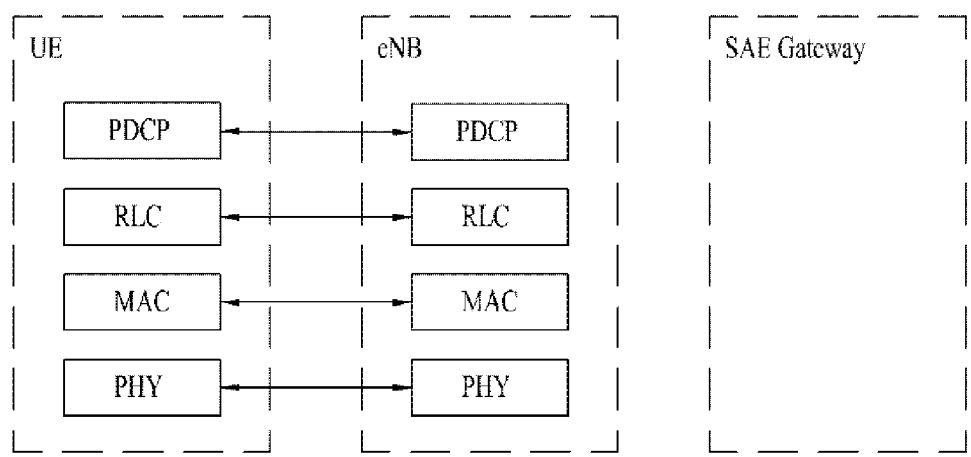

FIG. 2 illustrates a control plane and a user plane (U-Plane) of a radio interface protocol between a User Equipment (UE) and an E-UTRAN according to the 3GPP wireless access network standard. The control plane is a passage through which control messages that a UE and a network use in order to manage calls are transmitted. The user plane is a passage through which data (e.g., voice data or Internet packet data) generated at an application layer is transmitted.

The physical layer, which is the first layer, provides an information transfer service to an upper layer using a physical channel. The physical layer is connected to a Medium Access Control (MAC) layer, located above the physical layer, through a transport channel. Data is transferred between the MAC layer and the physical layer through the transport channel. Data transfer between different physical layers, specifically between the respective physical layers of transmitting and receiving sides, is performed through the physical channel. The physical channel uses time and frequency information as radio resources. In more detail, using the time and frequency information as radio resources, the physical channel is modulated according to the Orthogonal Frequency Division Multiple Access (OFDMA) scheme via a downlink, and is modulated according to the Single Carrier Frequency Division Multiple Access (SC-FDMA) scheme via an uplink.

The MAC layer of the second layer provides a service to a Radio Link Control (RLC) layer, located above the MAC layer, through a logical channel. The RLC layer of the second layer enhances data transmission reliability. The functions of the RLC layer may also be implemented through internal functional blocks of the MAC layer. A PDCP layer of the second layer performs a header compression function to reduce unnecessary control information in order to efficiently transmit IP packets such as IPv4 or IPv6 packets over a radio interface with a relatively narrow bandwidth.

A Radio Resource Control (RRC) layer located at the lowermost of the third layer is defined only in the control plane and is responsible for control of logical, transport, and physical channels in association with configuration, re-configuration and release of Radio Bearers (RBs). The radio bearer (RB) is a service that the second layer provides for data communication between the UE and the network. To accomplish this, the RRC layer of the UE and the RRC layer of the network exchange RRC messages. The UE is in RRC connected mode if an RRC connection has been established between the RRC layer of the network and the RRC layer of the UE. Otherwise, the UE is in RRC idle mode. A Non-Access Stratum (NAS) layer located above the RRC layer performs functions such as session management and mobility management.

One cell of the eNB (eNode-B) is set to use a bandwidth such as 1.25, 2.5, 5, 10, 15 or 20 MHz to provide a downlink or uplink transmission service to UEs. Here, different cells may be set to use different bandwidths.

Downlink transport channels for transmission of data from the network to the UE include a Broadcast Channel (BCH) for transmission of system information, a Paging Channel (PCH) for transmission of paging messages and a downlink Shared Channel (SCH) for transmission of user traffic or control messages. User traffic or control messages of a downlink multicast or broadcast service may be transmitted through a downlink SCH and may also be transmitted through a downlink multicast channel (MCH). Uplink transport channels for transmission of data from the UE to the network include a Random Access Channel (RACH) for transmission of initial control messages and an uplink SCH for transmission of user traffic or control messages. Logical channels, which are located above the transport channels and are mapped to the transport channels, include a Broadcast Control Channel (BCCH), a Paging Control Channel (PCCH), a Common Control Channel (CCCH), a Multicast Control Channel (MCCH) and a Multicast Traffic Channel (MTCH).

Figure 3:
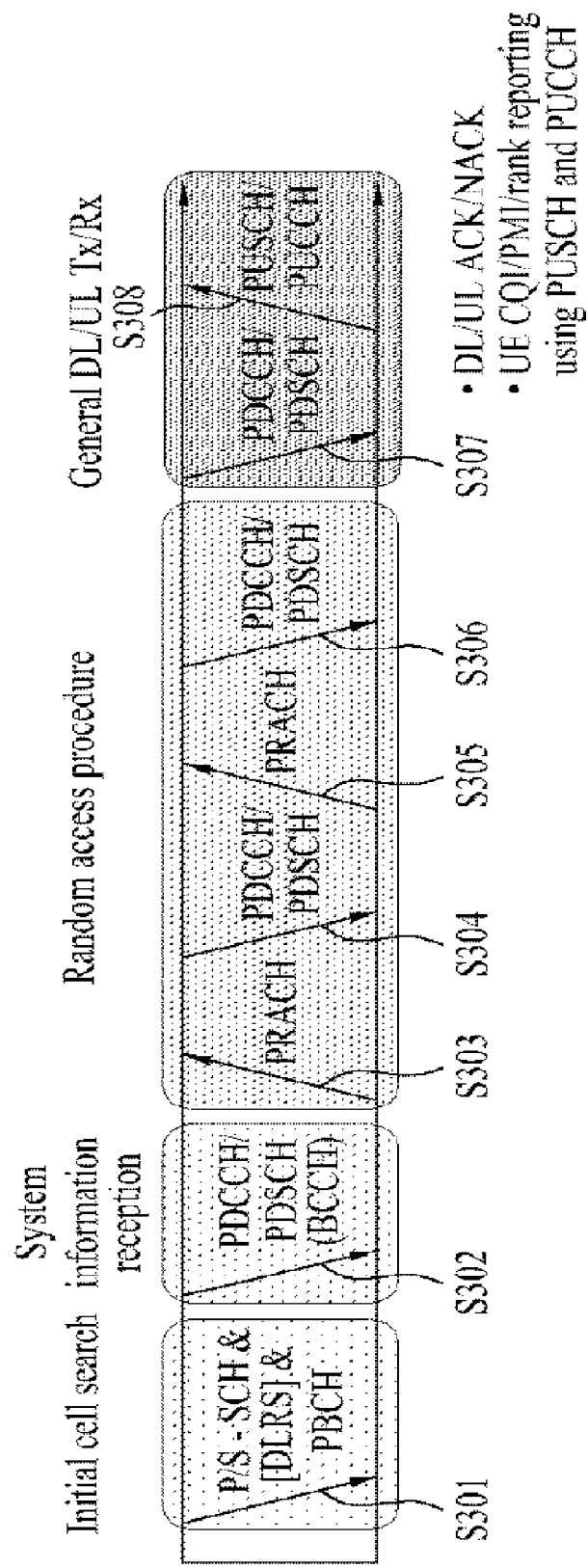
FIG. 3 is a conceptual diagram illustrating physical channels for use in a 3GPP system and a general method for transmitting a signal using the physical channels.

FIG. 3 is a conceptual diagram illustrating physical channels for use in a 3GPP system and a general method for transmitting a signal using the physical channels.

Referring to FIG. 3, when powered on or when entering a new cell, a UE performs initial cell search in step S301. The initial cell search involves synchronization with a BS. Specifically, the UE synchronizes its timing with the BS and acquires a cell Identifier (ID) and other information by receiving a Primary Synchronization CHannel (P-SCH) and a Secondary Synchronization CHannel (S-SCH) from the BS. Then the UE may acquire information broadcast in the cell by receiving a Physical Broadcast CHannel (PBCH) from the BS. During the initial cell search, the MS may monitor a downlink channel status by receiving a downlink Reference Signal (DL RS).

After the initial cell search, the UE may acquire more specific system information by receiving a Physical Downlink Control CHannel (PDCCH) and receiving a Physical Downlink Shared CHannel (PDSCH) based on information of the PDCCH in step S302.

On the other hand, if the UE initially accesses the BS or if the UE does not have radio resources for signal transmission, it may perform a random access procedure to the BS in steps S303 to S306. For the random access, the UE may transmit a predetermined sequence as a preamble to the BS on a Physical Random Access CHannel (PRACH) in steps S303 and S305 and receive a response message for the random access on a PDCCH and a PDSCH corresponding to the PDCCH in steps S304 and S306. In the case of contention-based RACH, the UE may perform a contention resolution procedure.

After the foregoing procedure, the UE may receive a PDCCH and a PDSCH in step S307 and transmit a Physical Uplink Shared CHannel (PUSCH) and a Physical Uplink Control CHannel (PUCCH) in step S308, as a general downlink/uplink (DL/UL) signal transmission procedure. In particular, the UE receives downlink control information (DCI) through a PDCCH. In this case, DCI includes control information such as resource allocation information for the UE, and has different formats according to use purposes.

On the other hand, uplink control information transmitted from the UE to the BS or downlink control information transmitted from the UE to the BS may include a downlink (DL) or uplink (UL) ACKnowledgement/Negative ACKnowledgment (ACK/NACK) signal, a Channel Quality Indicator (CQI), a Precoding Matrix Index (PMI) and/or a Rank Indicator (RI). The UE adapted to operate in the 3GPP LTE system may transmit the control information such as a CQI, a PMI, and/or an RI on the PUSCH and/or the PUCCH.

Figure 4:
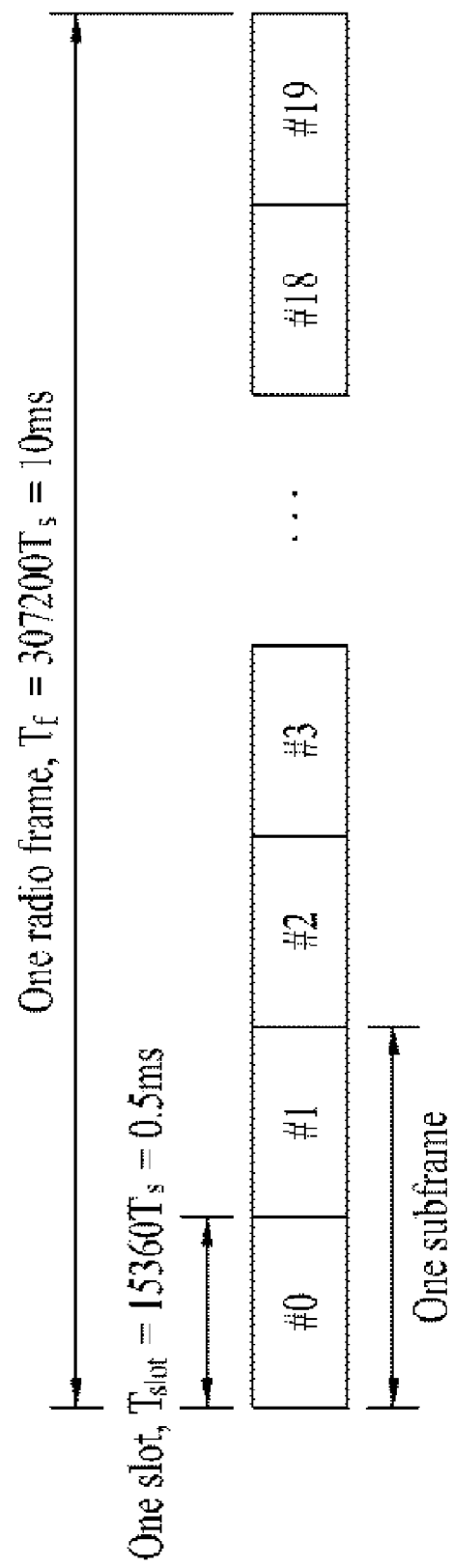
FIG. 4 is a diagram illustrating a structure of a radio frame used in an LTE system.

FIG. 4 is a diagram illustrating a structure of a radio frame used in an LTE system.

Referring to FIG. 4, the radio frame has a length of 10 ms (327200*Ts) and includes 10 subframes of equal size. Each subframe has a length of 1 ms and includes two slots. Each slot has a length of 0.5 ms (15360*$T_s$). In this case, $T_s$ represents a sampling time, and is expressed by '$T_s$=1/(15 kHz 2048)=3.2552*$10^{-8}$ (about 33 ns)'. The slot includes a plurality of OFDM symbols in a time domain, and includes a plurality of resource blocks (RBs) in a frequency domain. In the LTE system, one resource block includes twelve (12) subcarriers seven (or six) OFDM (Orthogonal Frequency Division Multiplexing) symbols. A Transmission Time Interval (TTI) which is a transmission unit time of data can be determined in a unit of one or more subframes. The aforementioned structure of the radio frame is only exemplary, and various modifications can be made to the number of subframes contained in the radio frame or the number of slots contained in each subframe, or the number of OFDM symbols in each slot.

Figure 5:
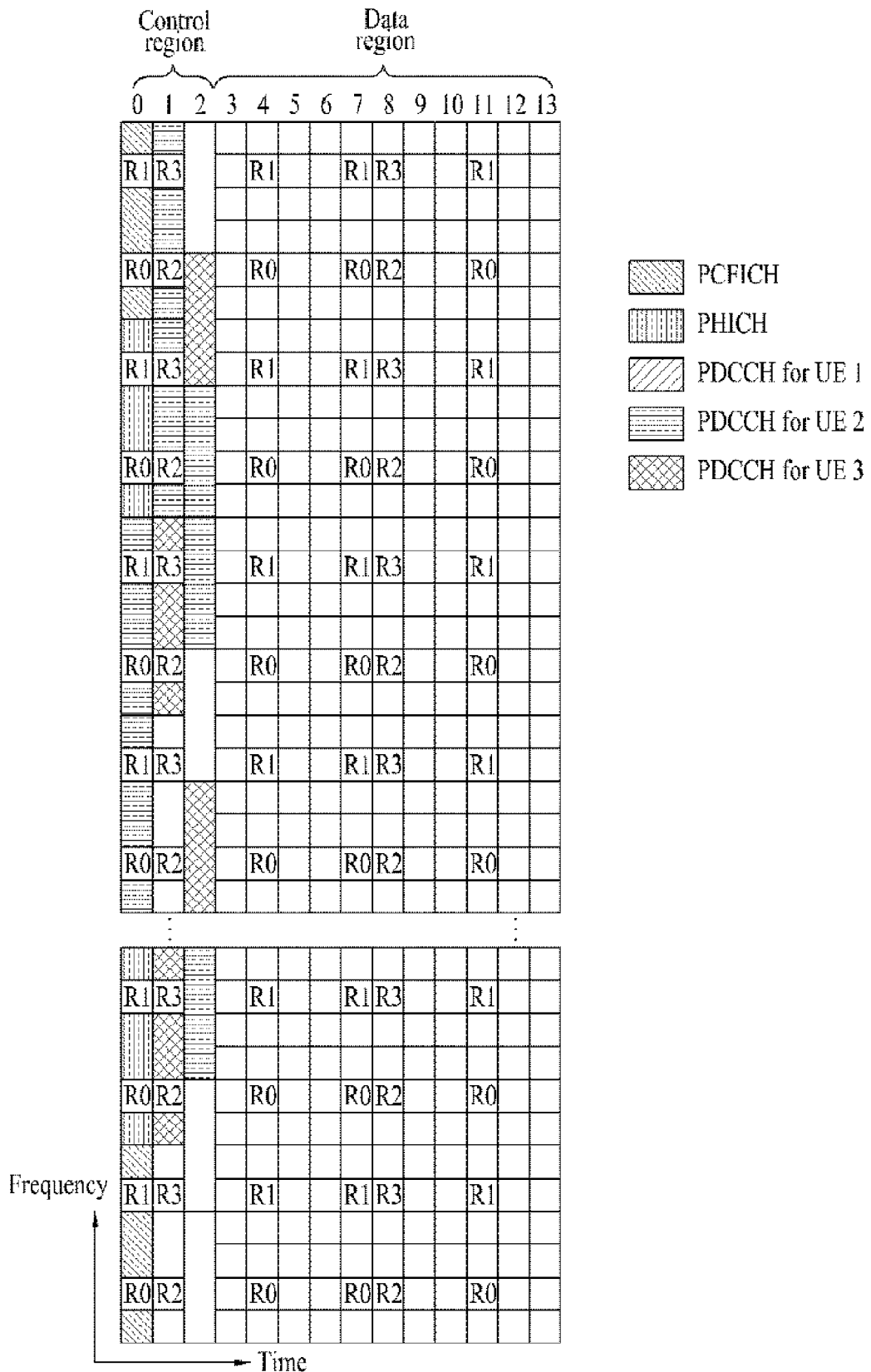
FIG. 5 illustrates a downlink (DL) radio frame structure for use in an LTE system.

FIG. 5 shows a control channel contained in a control region of one subframe in a downlink radio frame according to one embodiment of the present invention.

Referring to FIG. 5, one subframe includes 14 OFDM symbols. First to third ones of the 14 OFDM symbols may be used as a control region, and the remaining OFDM symbols (i.e., 11 to 13 OFDM symbols) may be used as a data region. In FIG. 5, R1 to R4 represent reference signals (RSs) (also called pilot signals) of antennas 0 to 3, respectively. In a general subframe, RSs of the antennas 0 to 3 are fixed to a predetermined pattern irrespective of a control region and a data region. The control channel is allocated to a resource, to which the RS is not allocated, in the control region. A traffic channel is allocated to a resource, to which the RS is not allocated, in the data region. A variety of control channels may be allocated to the control region, for example, a physical control format indicator channel (PCFICH), a physical hybrid ? ARQ indicator channel (PHICH), a physical downlink control channel (PDCCH), etc.

PCFICH is used as a physical control format indicator channel, and informs the UE of the number of OFDM symbols used for PDCCH at every subframe. PCFICH is located at a first OFDM symbol, and is established to have priority over PHICH and PDCCH. PCFICH includes 4 resource element groups (REGs), and individual REGs are distributed into the control region on the basis of a cell ID. One REG includes four REs. RE is a minimum physical resource defined by 'one subcarrier one OFDM symbol'. The PCFICH value indicates values of 1 to 3 or values of 2 to 4 according to the bandwidth, and is QPSK (Quadrature Phase Shift Keying)—modulated.

PHICH is used as a physical HARQ (Hybrid ?Automatic Repeat and reQuest) indicator channel, and carries HARQ ACK/NACK signals for uplink transmission. In other words, PHICH indicates a channel for transmitting DL ACK/NACK information for UL HARQ. The PHICH includes one REG, and is cell-specifically scrambled. An ACK/NACK signal is indicated by one bit, is BPSK (Binary Phase Shift Keying)? modulated. The modulated ACK/NACK is spread out with a spreading factor (SF) of 2 or 4. Several PHICHs mapped to the same resources construct a PHICH group. The number of PHICHs multiplexed in the PHICH group may be determined according to the number of spreading codes. PHICH (or PHICH group) may be repeated three times so as to obtain a diversity gain from a frequency domain and/or a time domain.

PDCCH acting as a physical downlink control channel is allocated to N first OFDM symbols of a subframe. In this case, N is an integer of 1 or higher and is indicated by a PCFICH. PDCCH includes one or more CCEs. PDCCH may inform each UE or a UE group of information related to resource allocation of PCH (Paging Channel) and DL-SCH (Downlink-shared channel), uplink scheduling grant, HARQ information, etc. The PCH and the DL-SCH are transmitted through a PDSCH. Therefore, the BS and the UE may transmit and receive data other than either specific control information or specific service data through the PDSCH.

Information indicating which one of UEs will receive data as an input, information indicating how the UEs receive PDSCH data, and information indicating whether the decoding is carried out are contained in the PDCCH. For example, it is assumed that a specific PDCCH is CRC-masked with a Radio Network Temporary Identity (RNTI) called 'A', and information of data, that is transmitted using radio resources 'B' (for example, a frequency location) and transmission format information 'C' (for example, a transmission block size, a modulation scheme, coding information, etc.), is transmitted through a specific subframe. In this case, a UE located in a cell monitors PDCCH using its own RNTI information. If at least one UE having the RNTI 'A' is present, the UEs receive PDCCH and receive PDSCH indicated by 'B' and 'C' through the received PDCCH information.

Figure 6:
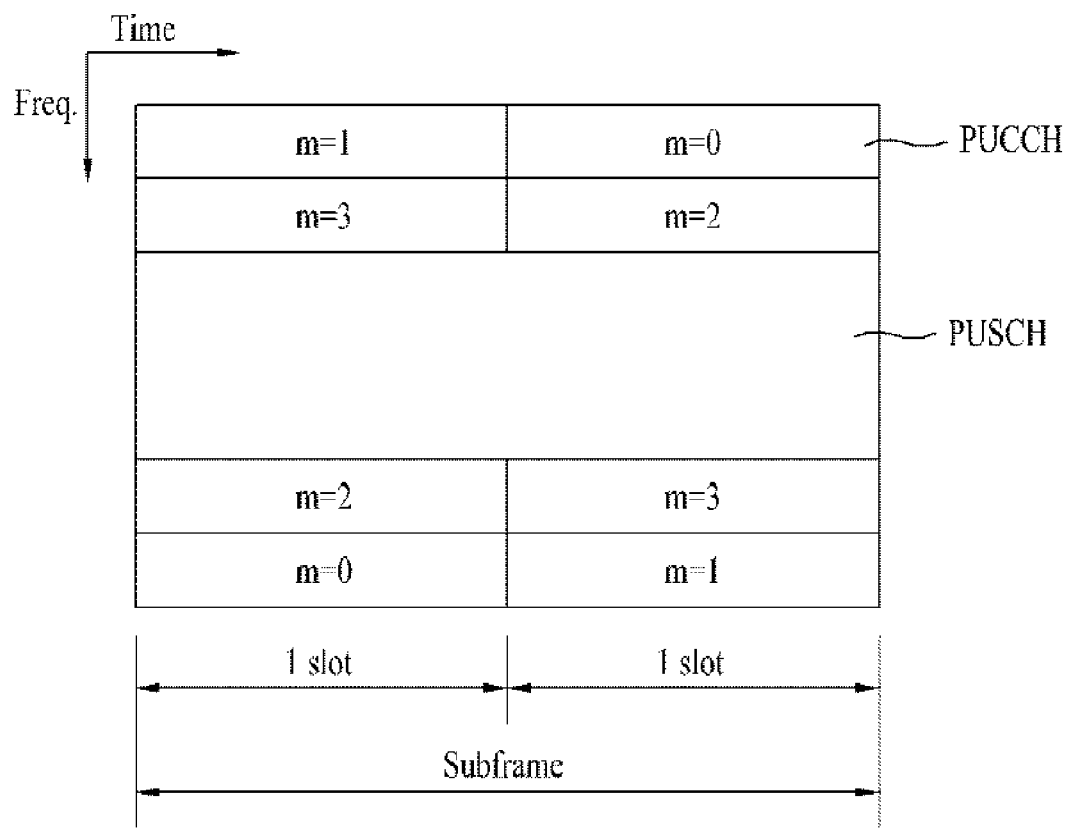
FIG. 6 illustrates an uplink (UL) subframe structure for use in an LTE system.

FIG. 6 illustrates an uplink (UL) subframe structure for use in an LTE system.

Figure 7:
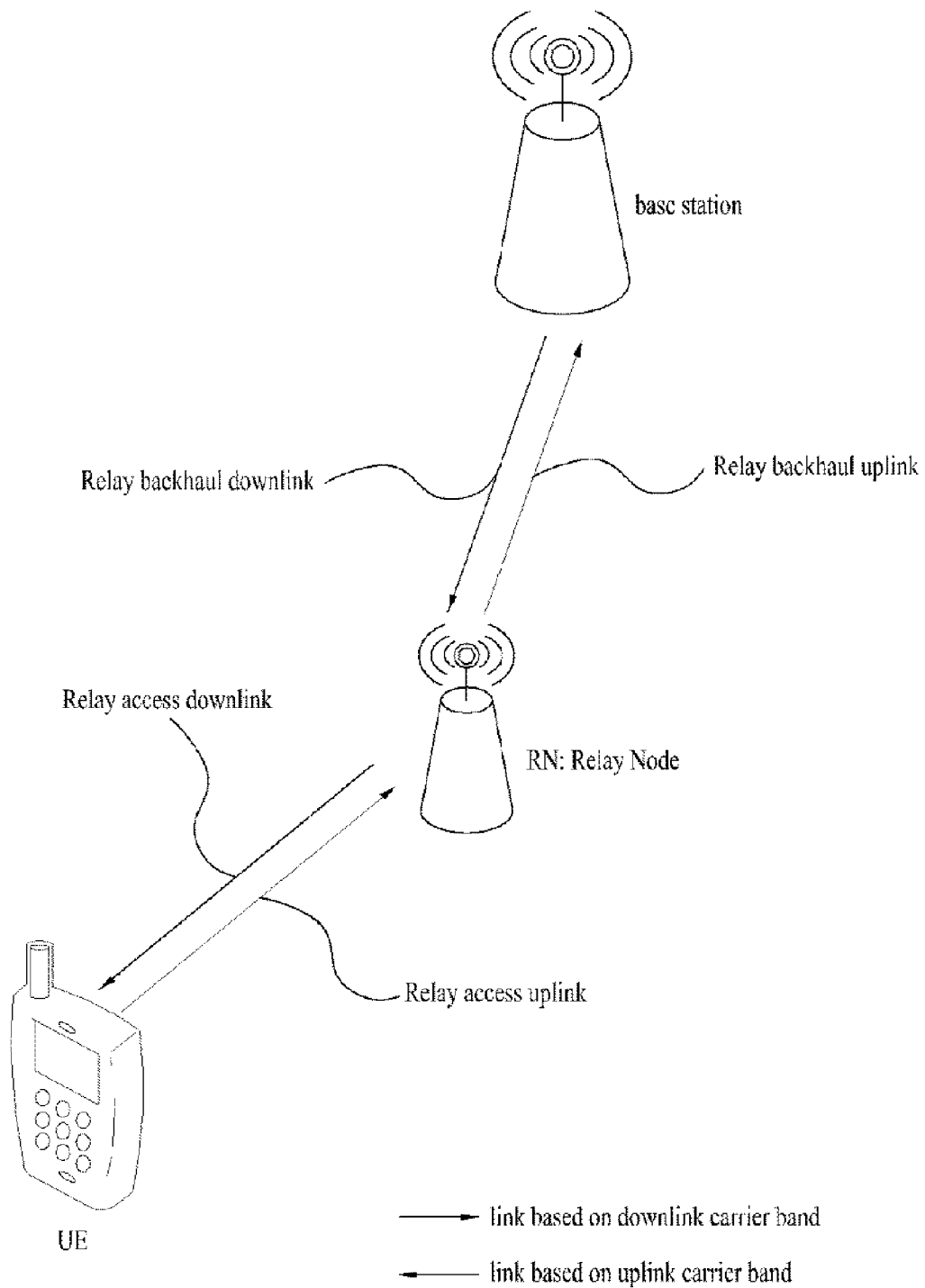
FIG. 7 is a conceptual diagram illustrating a relay backhaul link and a relay access link for use in a wireless communication system.

Referring to FIG. 6, the UL subframe may be classified into a first region to which a physical uplink control channel (PUCCH) carrying control information is allocated and a second region to which a physical uplink shared channel (PUSCH) carrying user data is allocated. The center part of the subframe is allocated to PUSCH, and both parts of the data region is allocated to PUCCH in the frequency domain. Control information transmitted over PUCCH may include ACK/NACK used in HARQ, a Channel Quality Indictor (CQI) indicating a downlink channel state, a Rank Indicator (RI) for MIMO, a scheduling request (SR) acting as an UL resource allocation request, etc. PUCCH for one UE uses one resource block (RB) that occupies different frequencies in each slot of the subframe. That is, two RBs allocated to PUCCH is frequency-hopped at a boundary between slots. In particular, as can be seen from FIG. 7, FIG. 7 is a conceptual diagram illustrating a relay backhaul link and a relay access link for use in a wireless communication system. As can be seen from FIG. 7, PUCCH of m=0, PUCCH of m=1, PUCCH of m=2, and PUCCH of m=3 are allocated to the subframe.

In the meantime, if a channel condition between the base station (BS) and the UE is poor, a relay node (RN) is installed between the BS and the UE such that it can provide a RF channel having a superior channel condition to the UE. In addition, a relay node (RN) is introduced to a cell edge region having a poor channel condition such that it can provide a higher-speed data channel and can extend a cell service region. As described above, the relay node (RN) has been widely used to solve the propagation shade region in a wireless communication system.

Compared to the conventional art that is restricted to functions of a repeater capable of amplifying/transmitting a signal, the latest technology is being developed to cover more intelligent techniques. Furthermore, the relay node (RN) technology can reduce the cost requisite for the increasing BSs and the maintenance cost of a backhaul network in the next generation mobile communication system, and is requisite for extending the service coverage simultaneously while increasing the data processing rate. With the increasing development of relay node (RN) technology, the necessity for the relay node (RN) used in the conventional wireless communication system to be supported by the new wireless communication system is also increasing.

As the technology for forwarding a link connection between the BS and the UE is introduced to a relay node (RN) in a 3rd Generation Partnership Project Long Term Evolution ? Advanced (3GPP LTE-A) system, two links having different attributes are applied to a UL carrier frequency band and a DL carrier frequency band. The connection link between the BS and the RN is defined as a backhaul link. Transmission of data using downlink (DL) resources according to a Frequency Division Duplex (FDD) or Time Division Duplex (TDD) scheme is referred to as a backhaul downlink. Transmission of data using uplink (UL) resources according to the FDD or TDD scheme is referred to as a backhaul uplink.

FIG. 7 is a conceptual diagram illustrating a relay backhaul link and a relay access link for use in a wireless communication system.

Referring to FIG. 7, As the relay node (RN) is introduced to perform forwarding of link connection between the BS and the UE, two links having different attributes are applied to a UL carrier frequency band and a DL carrier frequency band. The connection link between the BS and the RN is defined as a backhaul link. Transmission of a backhaul link using either resources of a downlink frequency band (i.e., the case of Frequency Division Duplex (FDD)) or resources of a downlink subframe (i.e., the case of Time Division Duplex (TDD)) is referred to as a backhaul downlink. Transmission of a backhaul link using either resources of an uplink frequency band (i.e., the case of FDD) or resources of an uplink subframe (i.e., the case of TDD) is referred to as a backhaul uplink.

On the other hand, the connection link between the relay node (RN) and a series of UEs is defined as a relay access link. If the relay access link is transmitted using resources of the downlink frequency band (i.e., the case of FDD) or resources of a downlink subframe (i.e., the case of TDD), the above-mentioned transmission operation is represented by an access downlink. Otherwise, if the relay access link is transmitted using resources of the uplink frequency band (i.e., the case of FDD) or resources of an uplink subframe (i.e., the case of TDD), the above-mentioned transmission operation may be represented by an access uplink.

The RN may receive information from the BS through a relay backhaul downlink, and may transmit information to the BS through a relay backhaul uplink. In addition, the relay node may transmit information to the UE through the relay access downlink, or may receive information from the UE through the relay access uplink.

Meanwhile, in association with the band (or spectrum) of the relay node (RN), one case in which the backhaul link operates in the same frequency band as in the access link is referred to as 'In-band', and the other case in which the backhaul link operates in a frequency band different from that of the access link is referred to as 'Out-band'. In the above-mentioned two cases of the in-band and the out-band, it is necessary for an UE (hereinafter referred to as a legacy UE) that is operated in the legacy LTE system (for example, Release-8) to access a donor cell.

Relay nodes (RNs) can be classified into a transparent RN and a non-transparent RN according to whether or not the UE recognizes the RN. The transparent RN indicates an exemplary case in which it is impossible to recognize whether the UE communicates with a network through the RN, and the non-transparent RN indicates another exemplary case in which it is possible to recognize whether the UE communicates with a network through the RN.

In relation to the control of RN, RNs can be classified into a relay node serving as a part of a donor cell and another relay node capable of controlling a cell alone.

Although the relay node serving as a part of the donor cell may have an RN identifier (ID), the RN does not have its own cell identity. If Radio resource Management (RPM) is partially controlled by the BS including the donor cell (although the remaining parts of RPM are located in the RN), the above-mentioned RN is considered to be a relay node (RN) serving as a part of the donor cell. Preferably, the above-mentioned RN may support the legacy UE. For example, smart repeaters, decode-and-forward relay nodes, a variety of L2 (2nd layer) RNs, and Type-2 RNs may belong to the above-mentioned RN.

According to the relay node (RN) capable of controlling the cell alone, this RN controls one or more cells, provides unique physical layer cell identity to each cell controlled by the RN, and is able to use the same RPM mechanism. From the viewpoint of the UE, there is no difference between accessing a cell controlled by the RN and accessing a cell controlled by a general BS. Preferably, cells controlled by the above-mentioned RNs may support the legacy UE. For example, a Self-backhauling RN, L3 (3rd layer) RN, Type-1 RN, and Type-1a RN may belong to the above-mentioned RN.

The Type-1 RN controls a plurality of cells as In-band RN, and the UE considers each cell to be a separate cell distinguished from the donor cell. In addition, several cells are assigned respective physical cell IDs (defined in LTE Release-8), and the RN may transmit its own synchronization channel, a reference signal, and the like. In case of a single-cell operation, the UE can directly receive scheduling information and a HARQ feedback from the RN, and can transmit its own control channel (scheduling request (SR), CQI, ACK/NACK, etc.) to the RN. In addition, the legacy UE (that is operated according to LTE Release-8 system) considers the Type-1 RN to be a legacy BS (that is operated according to the LTE Release-8 system). That is, the Type-1 RN has backward compatibility. On the other hand, from the viewpoint of a UE that is operated according to the LTE-A system, the Type-1 RN is considered to be different from the legacy BS, resulting in the improvement of performance or throughput.

The Type-1a RN is operated in the out-band, and has the same characteristics as those of the Type-1 RN. The Type-1a RN operation may be configured to minimize (or eliminate) the influence of L1 (1st layer) operation.

The Type-2 RN may be an In-band RN, does not have a separate physical cell ID, and does not form a new cell. The Type-2 RN considers the legacy IE to be transparent, and the legacy UE is unable to recognize the presence of the Type-2 RN. Although the Type-2 RN transmits PDSCH, it should be noted that the Type-2 RN does not transmit CRS and PDCCH.

On the other hand, in order for the RN to operate in the in-band, some resources for use in the time-frequency spaces must be reserved for a backhaul link and these resources may not be used for the access link. The above-mentioned resource definition is called 'resource partitioning'.

The general principles related to the resource partitioning in the relay node (RN) will be given below. The backhaul downlink and the access downlink can be multiplexed in one carrier frequency according to the Time Division Multiplexing (TDM) scheme (That is, only one of the backhaul downlink and the access downlink can be activated at a specific time). Similar to this, the backhaul uplink and the access uplink can be TDM-multiplexed in one carrier frequency according to the TDM scheme (That is, only one of the backhaul uplink and the access uplink can be activated at a specific time).

In association with the backhaul link multiplexing based on the FDD scheme, backhaul downlink transmission is carried out in a downlink frequency band, and backhaul uplink transmission is carried out in an uplink frequency band. In association with the backhaul link multiplexing based on the TDD scheme, backhaul downlink transmission is carried out in a downlink subframe of the BS and the RN, and backhaul uplink transmission is carried out in an uplink subframe of the BS and the RN.

In case of the In-band RN, provided that backhaul downlink is received from the BS within a predetermined frequency band and at the same time access downlink is transmitted to the UE within the same frequency band, a signal transmitted from the transmitter of the RN may be received from the receiver of the RN, such that signal interference or RF jamming may occur in the RF front-end of the RN. Similar to this, assuming that the access uplink is received from the UE within a predetermined frequency band and at the same time the backhaul uplink is transmitted to the BS within the same frequency band, signal interference may occur in the RF front-end of the RN. Therefore, the present invention has difficulty in implementing simultaneous transmission/reception within one frequency band of the RN on the condition that a reception (Rx) signal and a transmission (Tx) signal are not spaced apart from each other (for example, the Tx antenna and the Rx antenna are not geographically spaced apart from each other (e.g., one of the Tx and Rx antennas is installed on the ground or the other one is installed on the underground).

A method for obviating the above-mentioned signal interference controls the RN not to transmit a signal to the UE while the RN receives a signal from the donor cell. In other words, a gap may occur in transmission from the RN to the UE, and the UE (including the legacy UE) may be established not to receive any data from the RN during the gap. The above-mentioned gap may be established by constructing a Multicast Broadcast Single Frequency Network (MBSFN) subframe.

Figure 8:
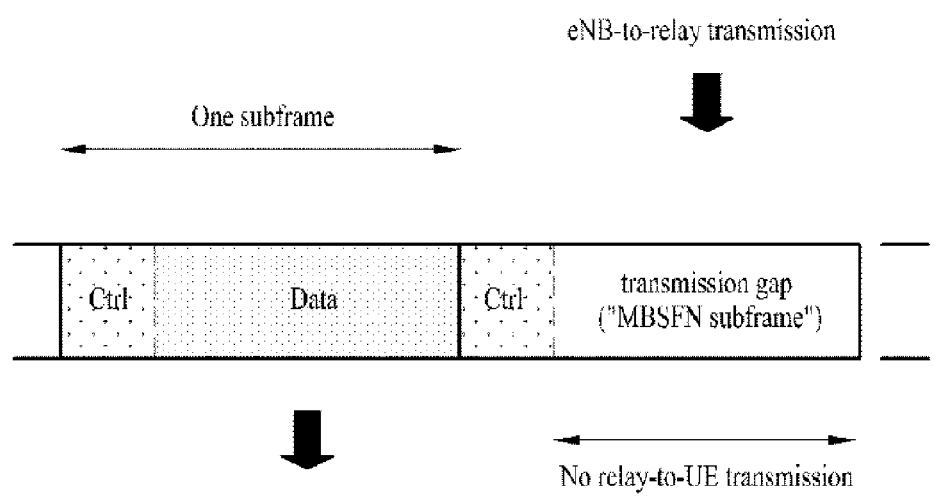
FIG. 8 illustrates an example of relay node (RN) resource partitioning.

FIG. 8 illustrates an example of relay node (RN) resource partitioning.

Referring to FIG. 8, the first subframe is a general subframe, and transmits a downlink (i.e., an access downlink) control signal and data from the RN to the UE. The second subframe is an MBSFN subframe. While a control signal is transmitted from the RN to the UE in the control region of the downlink subframe, not signal is transmitted from the RN to the UE in the remaining region of the downlink subframe. Here, since the legacy UE expects transmission of PDCCH through all the downlink subframes (that is, it is necessary for legacy UEs contained in the RN coverage to receive PDCCH at every subframe and then perform a measurement function), it is necessary for the PDCCH to be transmitted through all the downlink subframes in order for each legacy UE to be correctly operated. Therefore, on a subframe established for downlink (i.e., backhaul downlink) transmission from the BS to the RN, the RN needs to perform transmission of access downlink instead of reception of backhaul downlink in the first N OFDM symbols (N=1, 2 or 3). In this case, since PDCCH is transmitted from the RN to the UE in the control region of the second subframe, the RN can provide backward compatibility for the serving legacy UE. While no signal is transmitted from the RN to the UE in the remaining regions of the second subframe, the RN can receive data or signals from the BS. Therefore, the above-mentioned resource partitioning scheme can prevent the access downlink transmission and the backhaul downlink reception from being simultaneously carried out in the in-band RN.

A second subframe that utilizes the MBSFN subframe will hereinafter be described in detail. The control region of the second subframe may be referred to as a relay node (RN) non-hearing interval. During the RN non-hearing interval, the RN can transmit an access downlink signal without receiving a backhaul downlink signal. As described above, the RN non-hearing interval may include the length of one OFDM, the length of two OFDMs or the length of three OFDMs. During the RN non-hearing interval, the RN transmits access downlink to the UE. In the remaining regions, the RN can receive the backhaul downlink from the BS. In this case, the RN cannot simultaneously transmit and receive data in the same frequency band, such that an unnecessary time is consumed for the RN that transitions from a transmission (Tx) mode to a reception (Rx) mode. Accordingly, it is necessary to establish a guard time (GT) in such a manner that the RN can perform Tx/Rx mode switching in some parts of the first interval of the backhaul downlink Rx region. Similar to this operation, even when the RN receives backhaul downlink from the BS and operates to transmit the access downlink to the UE, a guard time (GT) for Tx/Rx mode switching of the RN can be established. The length of such a GT may be defined as a value of a time domain. For example, the length of GT may be defined as k (k≥1) time samples (Ts) or may be set to the length of one or more OFDM symbols. Alternatively, if the RN backhaul downlink subframes are successively established, the guard time (GT) of the last part of the subframe may be defined or non-established. In addition, the guard time (GT) of the last part of the subframe may also be defined or non-established according to the relationship of timing alignment of a predetermined subframe. In order to maintain backward compatibility, the GT may be defined only in a frequency domain established for backhaul downlink subframe transmission (in the case where the GT is established in the access downlink interval, it is impossible to support the legacy UE). In the backhaul downlink Rx interval other than the guard time (GT), the RN is able to receive PDCCH and PDSCH from the BS. From the viewpoint of an RN dedicated physical channel, the received PDCCH and the received PDSCH may also be represented by Relay-PDCCH (R-PDCCH) and R-PDSCH (Relay-PDSCH), respectively.

Figure 9:
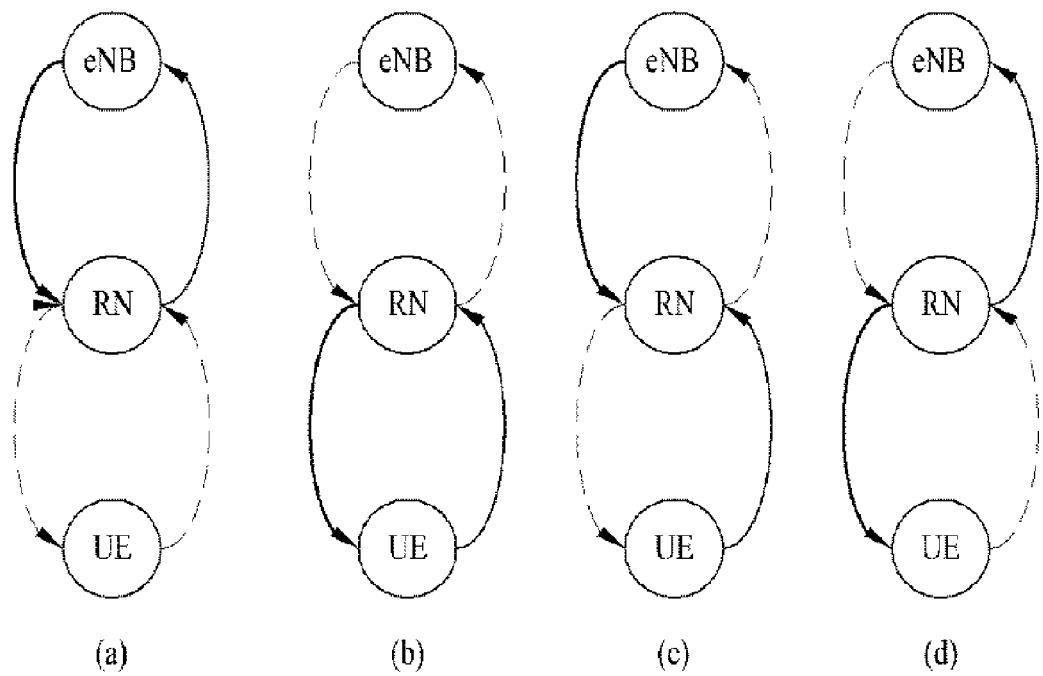
FIG. 9 illustrates a service link capable of being supported by a relay node in an LTE-A system.

FIG. 9 illustrates a service link capable of being supported by a relay node (RN) in an LTE-A system. In the LTE-A system, the RN may be designed to provide a BS-RN (Un) link and a RN-UE (Uu) link. That is, from the viewpoint of the physical aspect, the RN may be designed to have all or some of Tx/Rx functions for the Un link and Tx/Rx functions for the Uu link in consideration of configuration environments and costs.

In more detail, FIG. 9(a) shows one case in which the relay node (RN) supports uplink and downlink of the Un link, and FIG. 9(b) shows one case in which the relay node (RN) supports uplink and downlink of the Un link. FIG. 9(c) shows one case in which the relay node (RN) supports uplink of the Un link and downlink of the Uu link. FIG. 9(d) shows one case in which the relay node (RN) supports uplink of the Un link and downlink of the Uu link.

Figure 10:
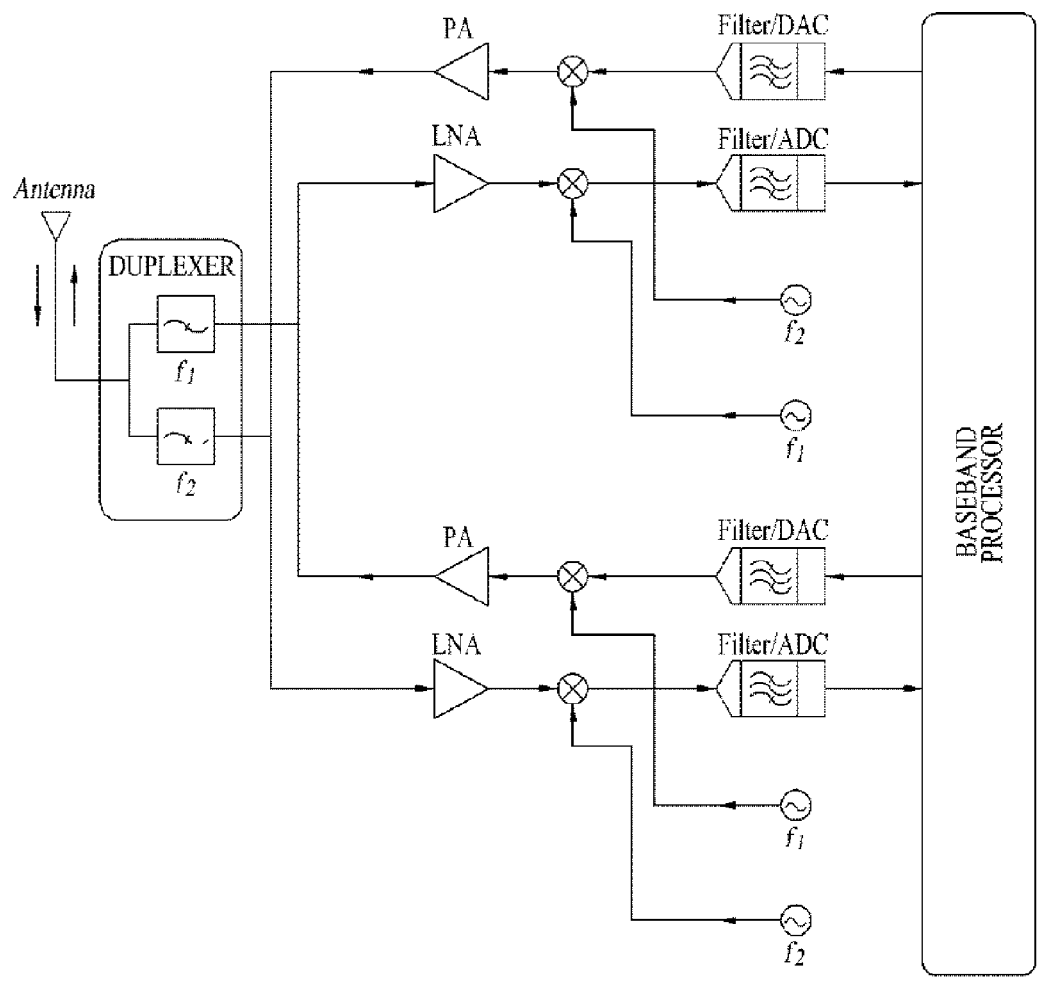
FIGS. 10 and 11 illustrate a general relay node (RN).
Figure 11:
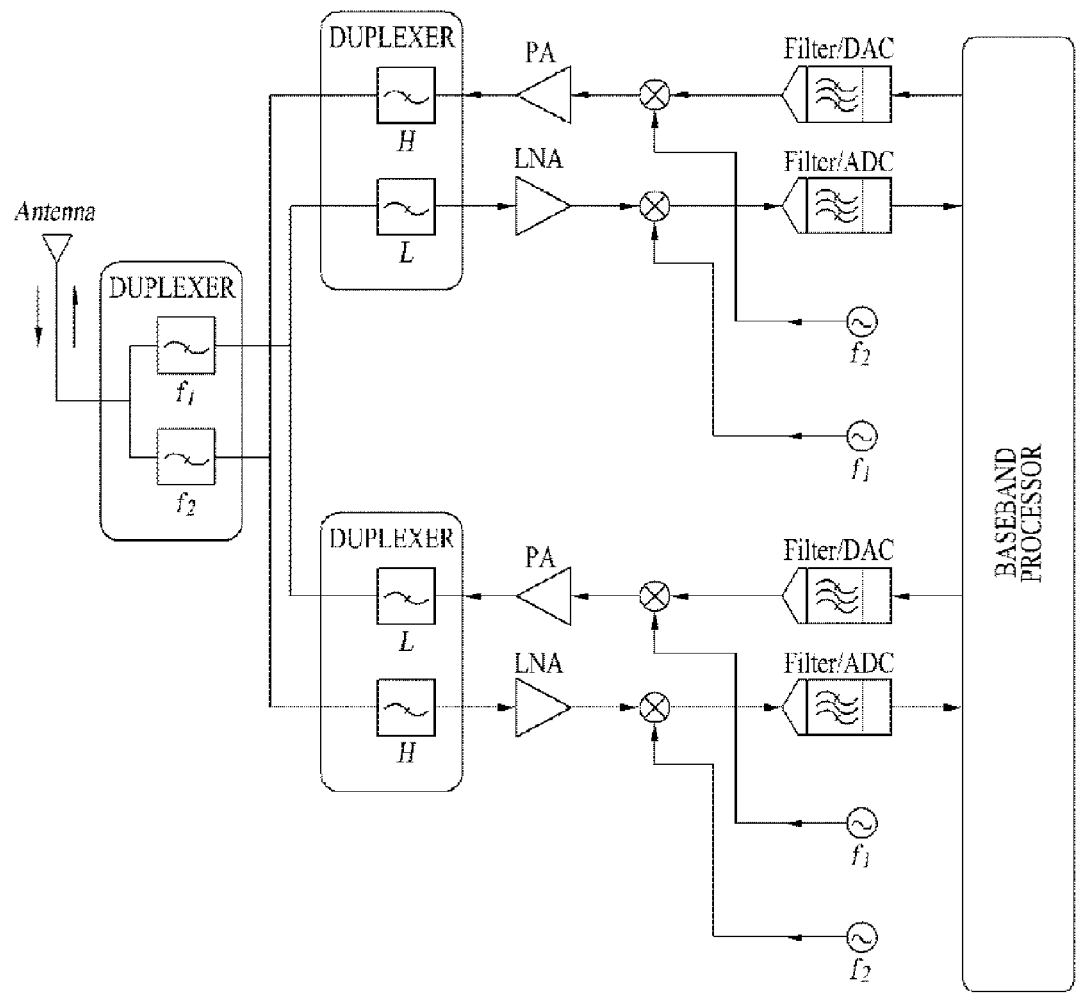

FIGS. 10 and 11 are a structural view illustrating a general relay node (RN).

Referring to FIG. 10, the relay node (RN) may include one antenna, two Power Amplifiers (PAs), two Low Noise Amplifiers (LNAs), and on duplexer. The relay node (RN) can simultaneously perform uplink and downlink of the Un link and uplink and downlink of the Uu link. That is, the relay node (RN) can simultaneously perform all the four operations shown in FIG. 9. A difference between the RN of FIG. 10 and the RN of FIG. 11 is the presence or absence of a diplexer. The RN of FIG. 10 and the RN of FIG. 11 can perform the same functions, and may further require a diplexer according to the implementation scheme.

Figure 12:
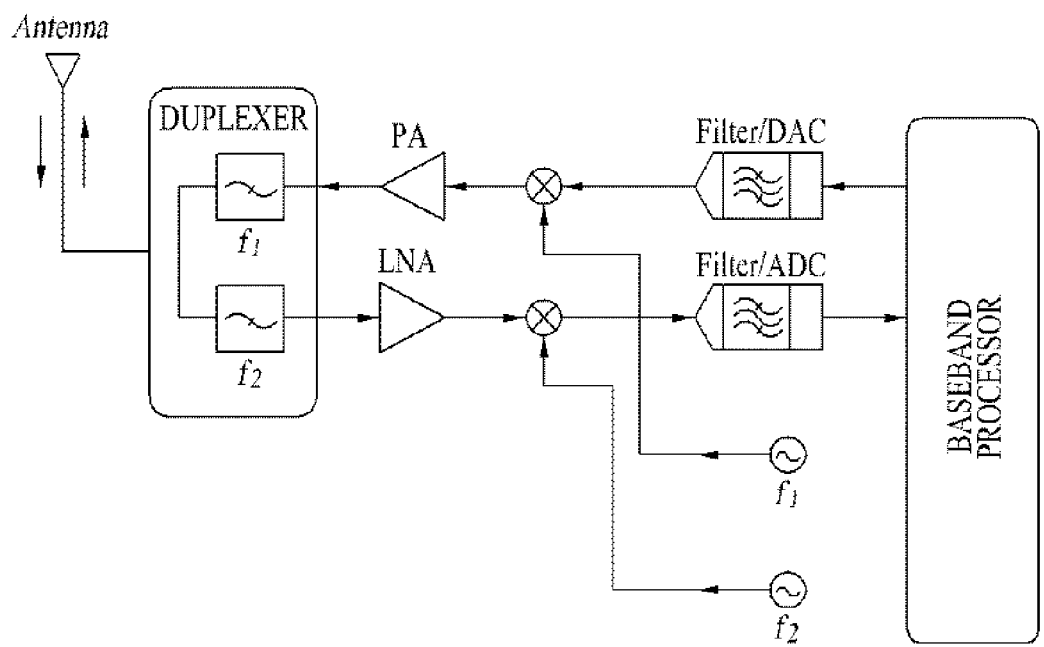
FIG. 12 illustrates a low-cost relay node (RN) according to one embodiment of the present invention.

FIG. 12 illustrates a low-cost relay node (RN) according to one embodiment of the present invention.

Compared to RNs of FIGS. 10 and 11, the low-cost RN shown in FIG. 12 is characterized in that it uses one PA and one LNA. Since the PA is very expensive, the necessity of the low-cost RN is increasing. However, it is difficult to easily implement the low-cost RN and the low-cost RN is unable to support all the operation modes shown in FIG. 9, such that the low-cost RN has a limitation to system management and maintenance. That is, the low-cost RN can support the modes (a) and (b) only, such that it has a disadvantage in that it cannot combine/activate the Un link and the Uu link.

Furthermore, the Un link and the Uu link are partitioned according to the TDM scheme, such that the Un link and the Uu link cannot be simultaneously activated through the same carrier. Because of the above-mentioned problems, the switching time is required for a TX-to-RX transition or an RX-to-TX transition, such that it may be impossible to use specific symbols. The present invention provides a method for changing the timing relationship between the Un link and the Uu link so as to minimize the number of wasted symbols.

Figure 13:
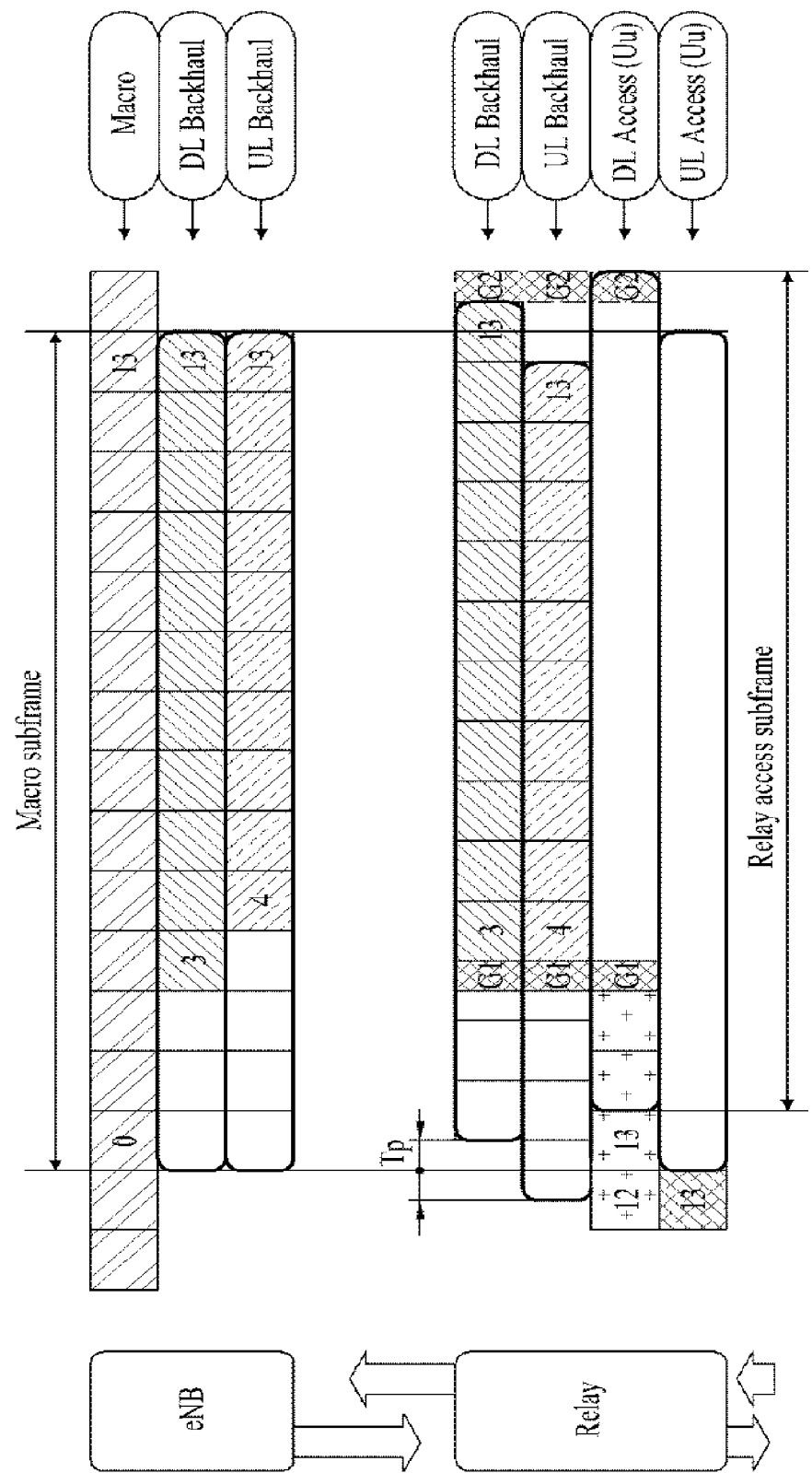
FIG. 13 illustrates general subframe timing for a low-cost relay node (RN).

FIG. 13 illustrates general subframe timing for a low-cost relay node (RN). Specifically, FIG. 13 shows that the subframe timing for the legacy RN to the low-cost RN. As can be seen from FIG. 13, the offset value is set to a ½ symbol, the timing of receiving the Un downlink subframe is earlier than the timing of transmitting the Uu downlink subframe by a predetermined time corresponding to an offset value, and the timing of transmitting the Un uplink subframe is earlier than the timing of receiving the Uu uplink subframe by a predetermined time corresponding to an offset value. In particular, FIG. 13 assumes that a propagation delay corresponding to a ½ symbol occurs.

Referring to FIG. 13, the uplink subframe of the Un link can use symbols of indexes 4 to 13, such that a total of 4 symbols corresponding to indexes 0 to 3 are wasted. In addition, the downlink subframe of the Un link can use symbols of indexes 3 to 13, such that a total of 3 symbols corresponding to indexes 0 to 2 are wasted.

Figure 14:
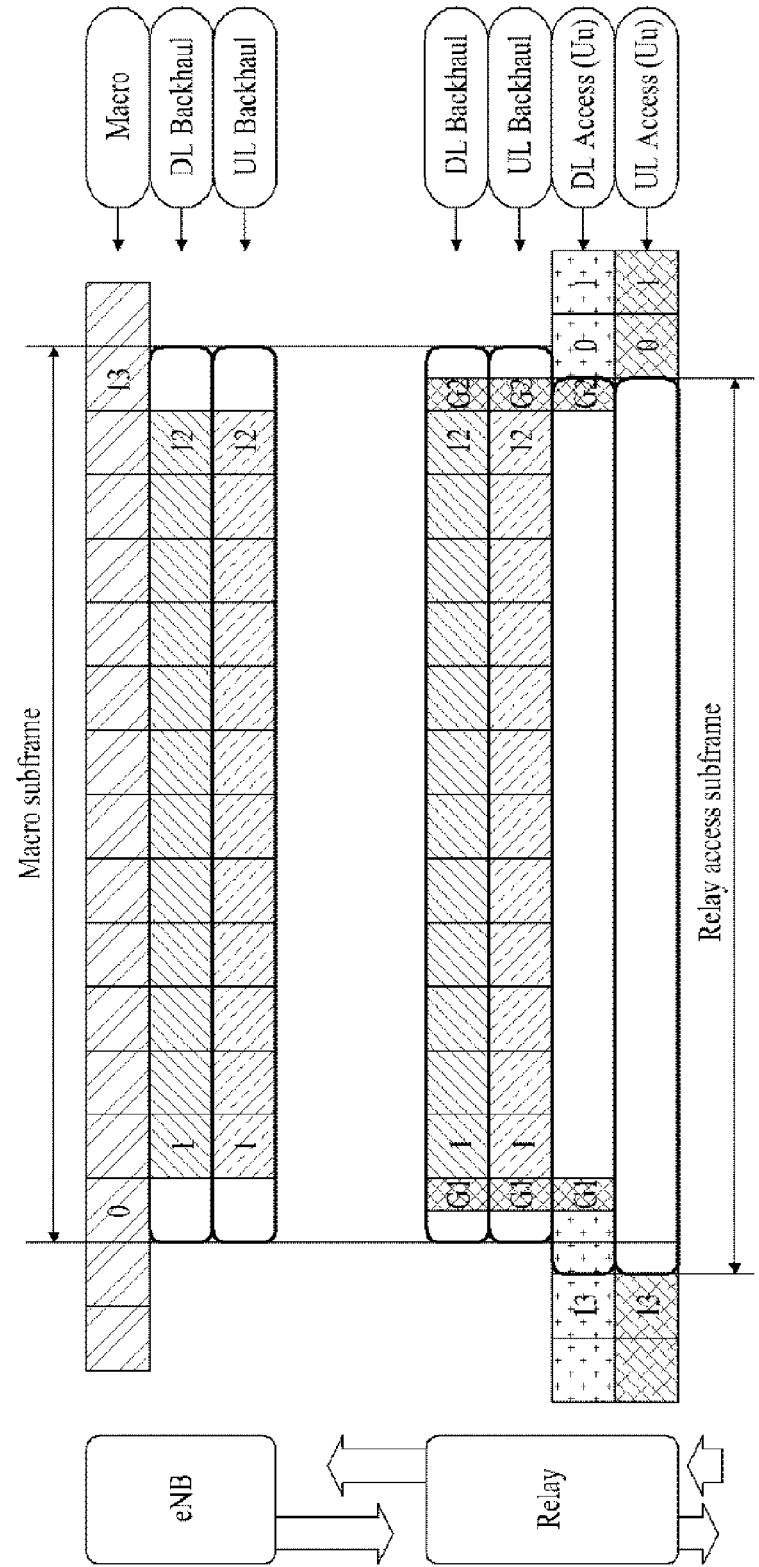
FIG. 14 illustrates subframe timing for a low-cost relay node (RN) according to one embodiment of the present invention.

FIG. 14 illustrates subframe timing for a low-cost relay node (RN) according to one embodiment of the present invention. In FIG. 14, it is assumed that the number of symbols requisite for PDCCH transmission is 1.

Referring to FIG. 14, in order to minimize the number of symbols wasted in the Un uplink subframe, the Tx/Rx timing of the Uu link subframe should be spaced apart from the Tx timing of the Un uplink subframe by an offset value. In this case, although the offset value may be changed according to a guard time (GT) for the Un-Uu link switching and the implementation of the low-cost relay node, the offset value to be decided should minimize the number of wasted symbols caused by relay Tx/Rx restrictions. Specifically, as can be seen from FIG. 14, an offset value is set to a ½ symbol, and this offset value of ½ symbol is located ahead of both the Tx/Rx timing of the Uu link subframe and the Tx timing of the Un-link uplink subframe. That is, as can be seen from FIG. 14, the edge of the UL subframe of the Uu link is identical to the edge of the DL subframe of the Uu link.

In addition, referring to FIG. 14, if the Tx/Rx timing of the Uu link subframe is located ahead of the Tx timing of the uplink subframe of the Un link by the ½ symbol, the subframe of the Un link can use only symbols of indexes 1 to 12. In other words, it is impossible to use the first symbol and the last symbol. In this case, a shortened PUCCH format in which one symbol is punctured may be applied to the RN as necessary.

On the other hand, it is preferable that an offset between the Un UL subframe and the Uu UL/DL subframe be set to the same value irrespective of propagation delay, and a detailed description thereof will hereinafter be described with reference to the accompanying drawings.

Figure 15:
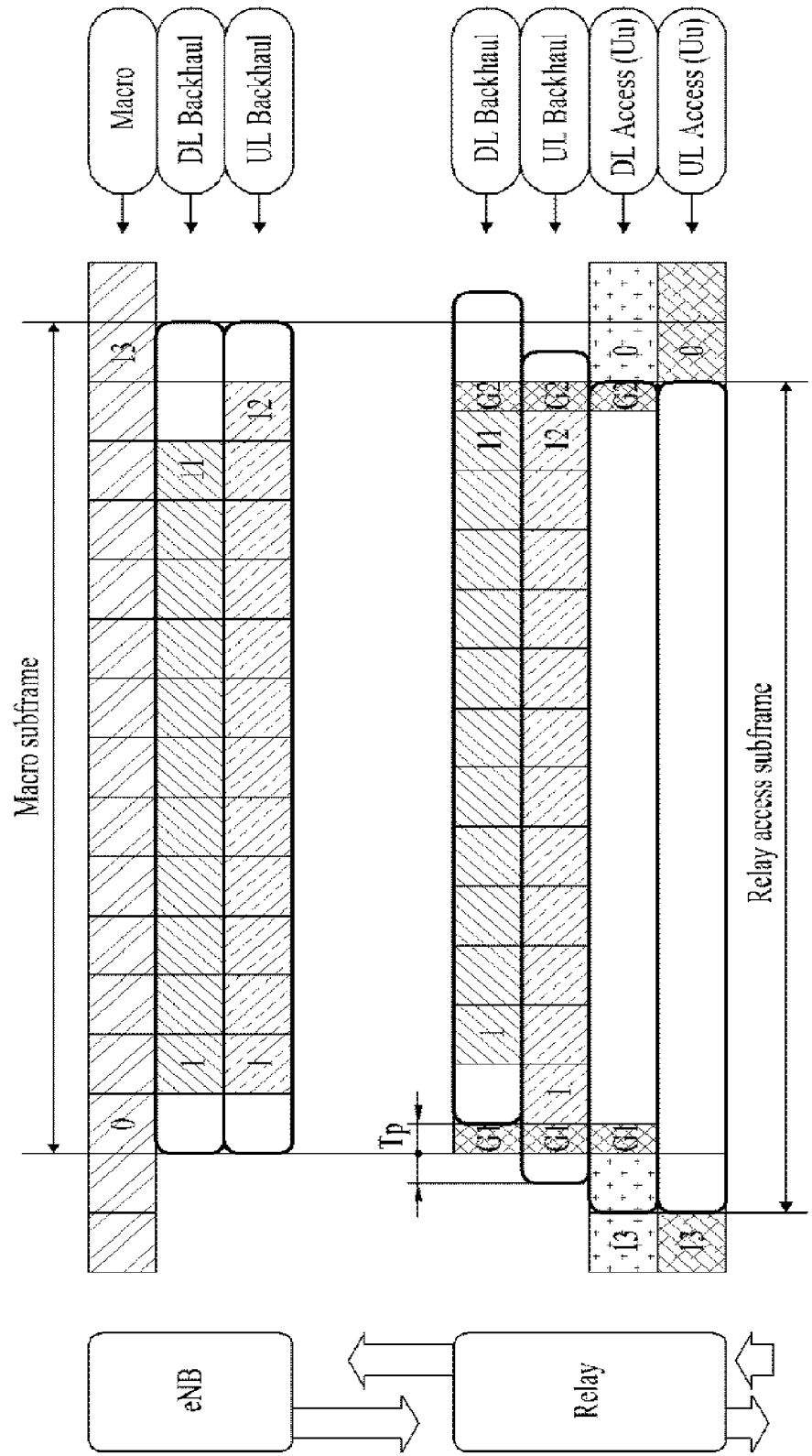
FIG. 15 illustrates subframe timing for a low-cost relay node (RN) according to one embodiment of the present invention.

FIG. 15 illustrates subframe timing for a low-cost relay node (RN) according to one embodiment of the present invention. In particular, as can be seen from FIG. 15, although a difference between the Tx/Rx timing of the Uu link subframe and the Tx timing of the UL subframe of the Un link is exemplarily set to an offset value of ½ symbol, it should be noted that a propagation delay (Tp) may also be generated by the ½ symbol. Therefore, reception of the Un link DL subframe of the RN is located behind repletion of the macro subframe by a predetermined time corresponding to the ½ symbol. The Un link subframe is transmitted faster than the macro subframe by a predetermined time corresponding to the ½ symbol, such that the subframe matching is implemented in the macro BS.

Referring to FIG. 15, the Un link UL subframe may use only symbols of indexes 1 to 12. That is, the Un link UL subframe is unable to use the first symbol and the last symbol. In addition, the Un link DL subframe may use only symbols of indexes 1 to 11.

Figure 16:
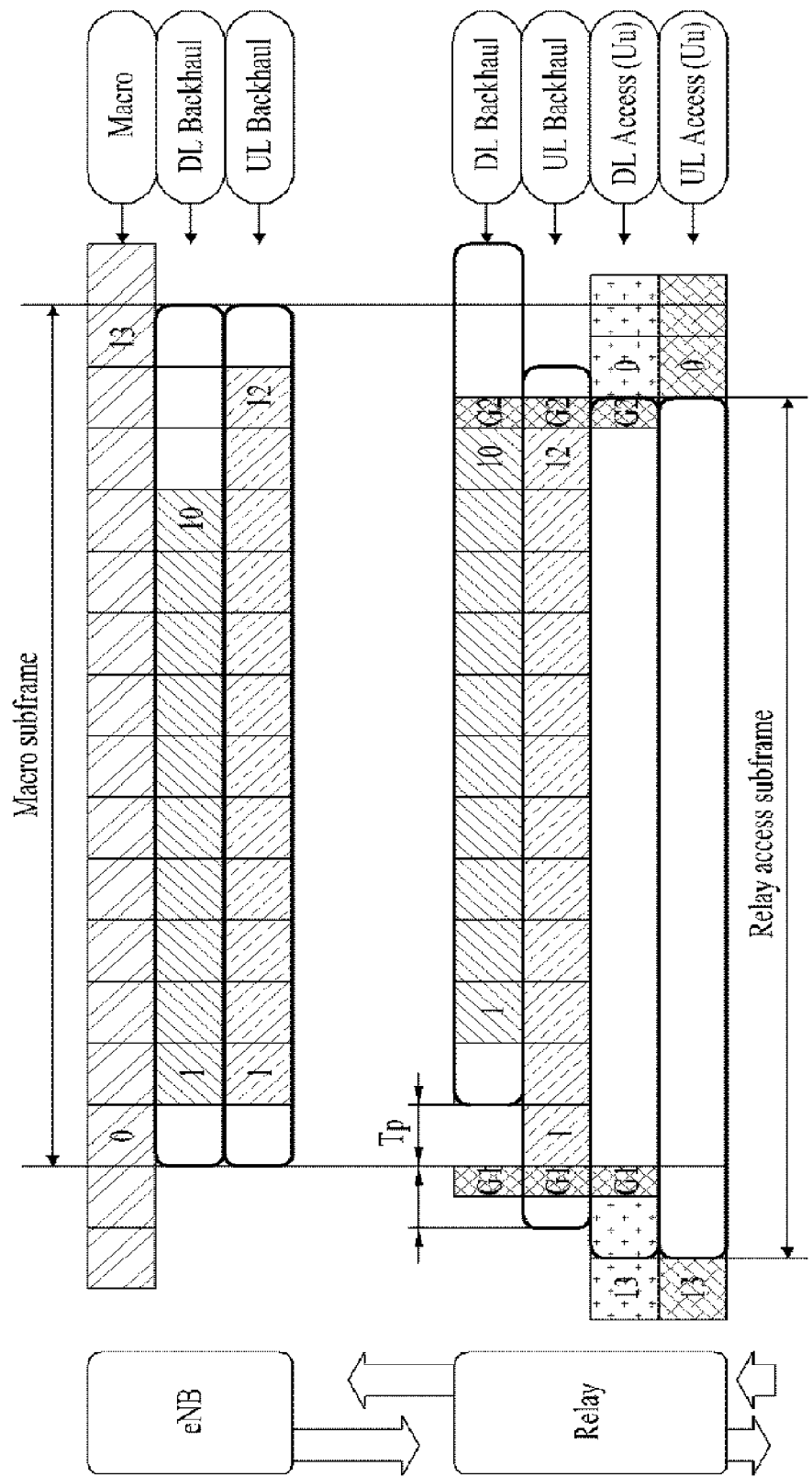
FIG. 16 illustrates subframe timing for a low-cost relay node (RN) according to one embodiment of the present invention.

FIG. 16 illustrates subframe timing for a low-cost relay node (RN) according to one embodiment of the present invention. In particular, as can be seen from FIG. 16, although a difference between the Tx/Rx timing of the Uu link subframe and the Tx timing of the UL subframe of the Un link is set to an offset value of ½ symbol, and the propagation delay corresponding to one symbol is generated. Likewise, reception of the Un link DL subframe of the RN is located behind that of the macro subframe by a predetermined time corresponding to one symbol, and the Un link subframe is transmitted faster than the macro subframe by a predetermined time corresponding to one symbol, such that the subframe matching is implemented in the macro BS.

Referring to FIG. 16, the UL subframe of the Un link may use only symbols of indexes 1 to 12. That is, the UL subframe of the Un link is unable to use the first symbol and the last symbol. In addition, the DL subframe of the Un link may use only symbols of indexes 1 to 10.

Referring to FIGS. 15 and 16, although the propagation delay value is changed to another value, collision between the Uu link subframe and the Un link subframe (i.e., the number of wasted symbols of the Un link UL subframe caused by the Uu-link to Un-link switching) can be minimized.

Figure 17:
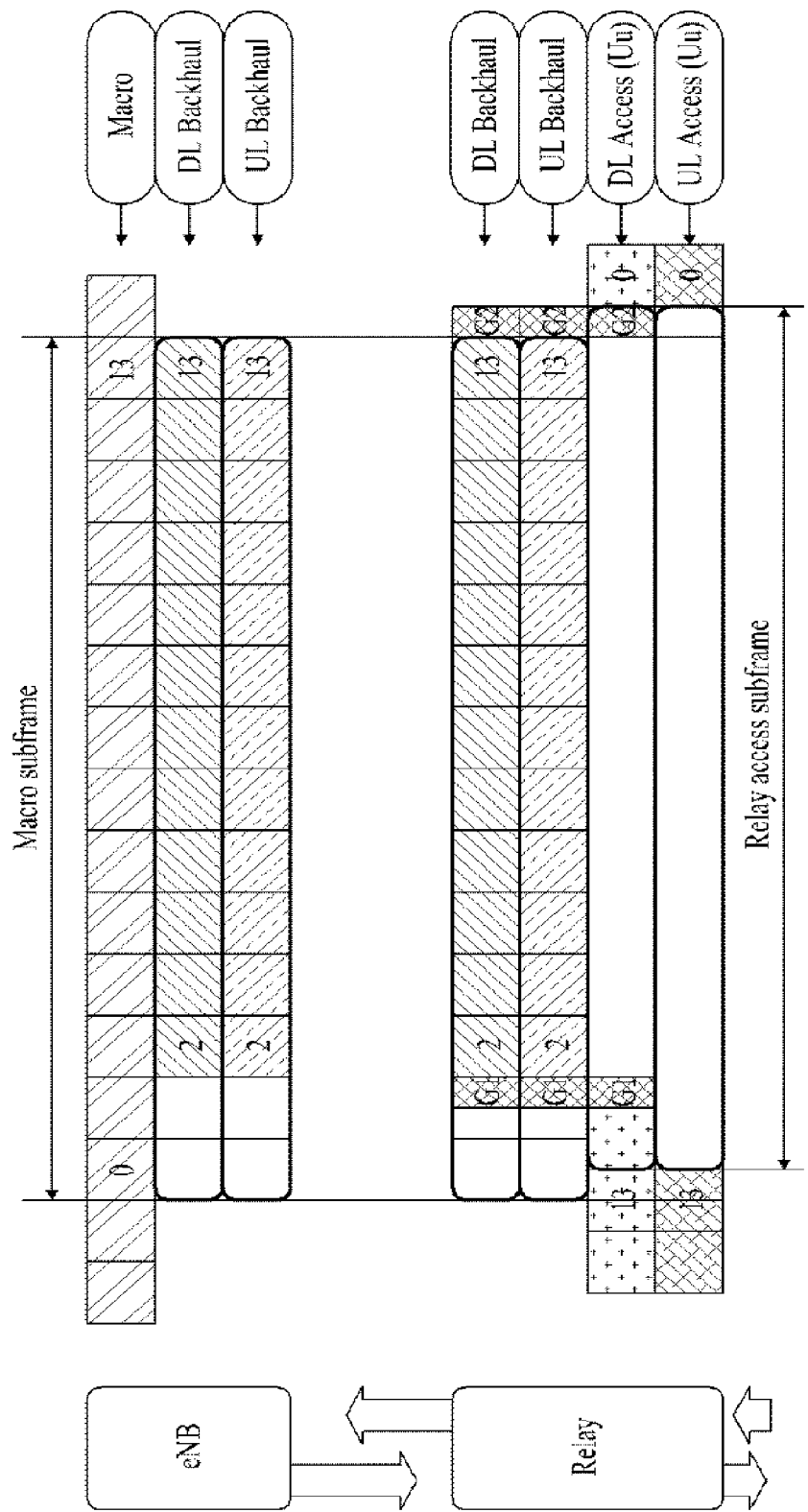
FIGS. 17 and 18 illustrate subframe timing for a low-cost relay node (RN) according to another embodiment of the present invention.
Figure 18:
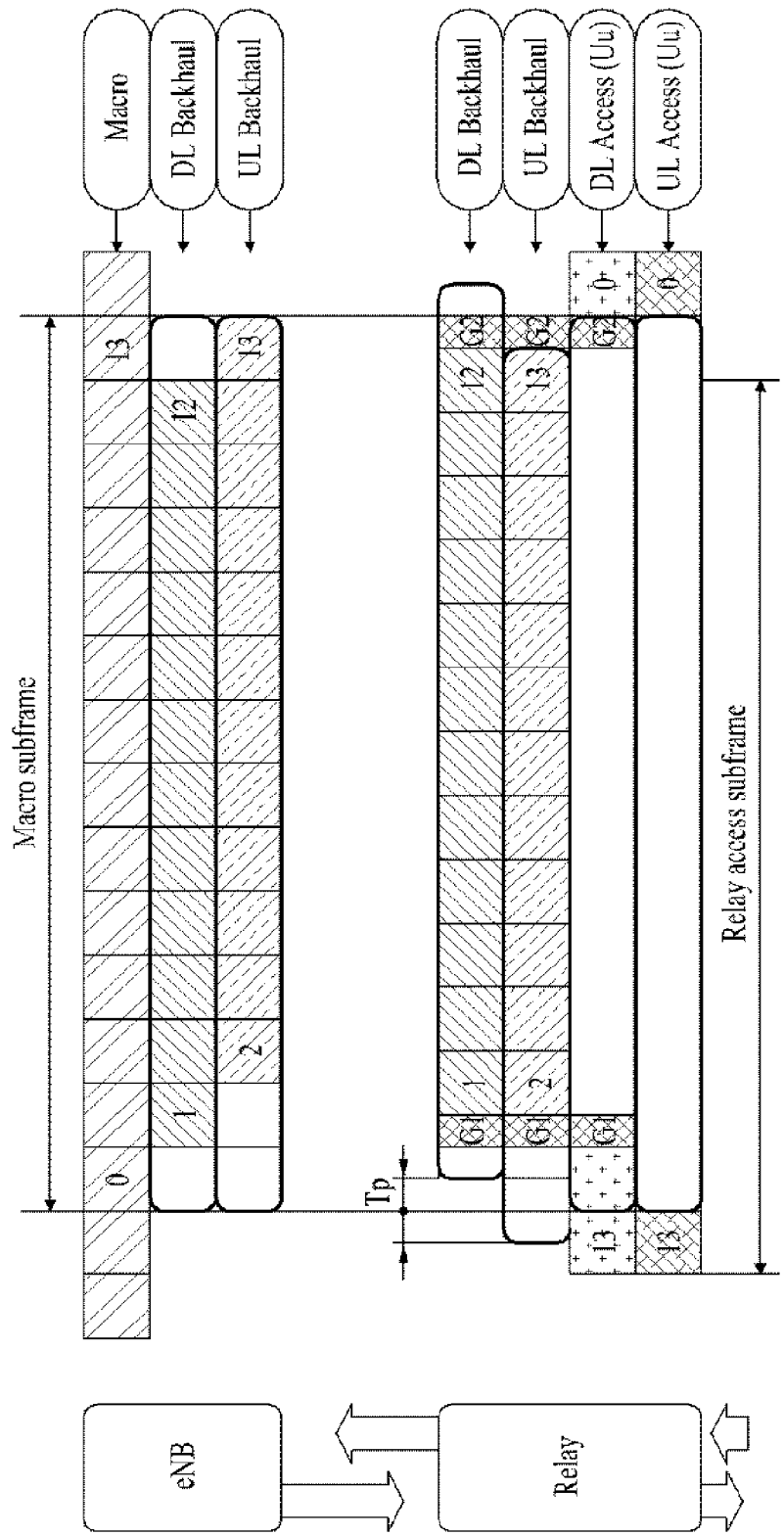

FIGS. 17 and 18 illustrate subframe timing for a low-cost relay node (RN) according to another embodiment of the present invention.

Referring to FIGS. 17 and 18, as can be seen from FIGS. 17 and 18, although a difference between the Tx/Rx timing of the Uu link subframe and the Tx timing of the UL subframe of the Un link is exemplarily set to an offset value of ½ symbol, it should be noted that the edge of the Uu link subframe is located behind the edge of the UL subframe of the Un link by the ½ symbol. In FIG. 18, it is assumed that the propagation delay corresponding to the ½ symbol is generated.

As shown in FIGS. 17 and 17, it is impossible to use first and second symbols of the UL subframe of the Un link. If the propagation delay is longer than the time of ½ symbol, the number of wasted symbols may be increased.

Needless to say, provided that most propagation delay is shorter than the length of one symbol, it is preferable that the backhaul subframe Tx/Rx timing be determined in consideration of only the waste of one or two symbols. In addition, although two symbols are wasted, the RN may be designed not of use the first and last symbols as shown in FIGS. 14 to 16, and it is preferable that the above-mentioned shortened PUCCH format be used.

Figure 19:
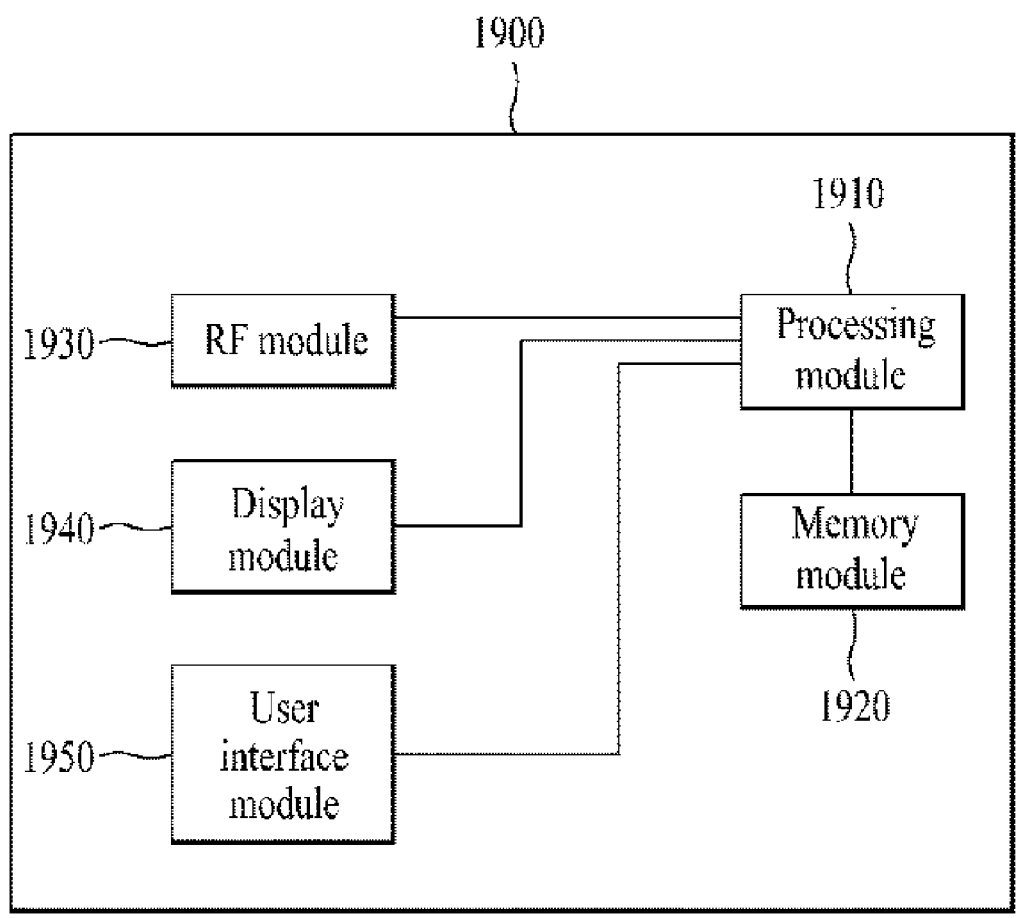
FIG. 19 is a block diagram illustrating a communication device according to one embodiment of the present invention.

FIG. 19 is a block diagram illustrating a communication device according to one embodiment of the present invention.

Referring to FIG. 19, the communication device 1900 includes a processor 1910, a memory 1920, a Radio Frequency (RF) module 1930, a display module 1940, and a user interface module 1950.

The communication device 1900 is disclosed only for illustrative purposes, and some modules may be omitted as necessary. In addition, the communication device 1900 may further include necessary modules. Some modules of the communication device 1900 may be identified as more detailed modules. The processor 1910 is configured to carry out the operations of the embodiments of the present invention. For a detailed operation of the processor 1910, reference will be made to FIGS. 1 to 18.

The memory 1920 is connected to the processor 1910, and stores an operating system, an application, a program code, data and the like. The RF module 1930 is connected to the processor 1910, converts a baseband signal into a radio frequency (RF) signal, or converts the RF signal into the baseband signal.

For these operations, the RF module 1930 performs analog conversion, amplification, filtering, and frequency up-conversion in order or performs such operations in reverse order. The display module 1940 is connected to the processor 1910 and displays various information. The scope or spirit of the display module 1940 of the present invention is not limited thereto, and the display module 1940 may be any of well-known elements, for example, a Liquid Crystal Display (LCD), a Light Emitting Diode (LED), an Organic Light Emitting Diode (OLED) and the like. The user interface module 1950 is connected to the processor 1010, and may be implemented as a combination of user interfaces such as a keypad, a touchscreen, etc.

The exemplary embodiments described hereinabove are combinations of elements and features of the present invention. The elements or features may be considered selective unless otherwise mentioned. Each element or feature may be practiced without being combined with other elements or features. Further, the embodiments of the present invention may be constructed by combining parts of the elements and/or features. Operation orders described in the embodiments of the present invention may be rearranged. Some constructions or characteristics of any one embodiment may be included in another embodiment and may be replaced with corresponding constructions or characteristics of another embodiment. It is apparent that the present invention may be embodied by a combination of claims which do not have an explicit cited relation in the appended claims or may include new claims by amendment after application.

The above-mentioned embodiments of the present invention have been disclosed on the basis of a data communication relationship between a relay node (RN) and a base station (BS). Specific operations to be conducted by the base station (BS) in the present invention may also be conducted by an upper node of the base station (BS) as necessary. In other words, it will be obvious to those skilled in the art that various operations for enabling the base station (BS) to communicate with a terminal in a network composed of several network nodes including the base station (BS) will be conducted by the base station (BS) or other network nodes other than the base station (BS). The term 'Base Station' may be replaced with the term 'fixed station', 'Node-B', 'eNode-B (eNB)', or access point as necessary.

The embodiments of the present invention may be achieved by various means, for example, hardware, firmware, software, or a combination thereof. In a hardware configuration, the embodiments of the present invention may be implemented by one or more application specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In a firmware or software configuration, the embodiments of the present invention may be achieved by a module, a procedure, a function, etc. performing the above-described functions or operations. Software code may be stored in a memory unit and driven by a processor. The memory unit is located at the interior or exterior of the processor and may transmit data to and receive data from the processor via various known means.

It will be apparent to those skilled in the art that various modifications and variations can be made in the present invention without departing from the spirit or scope of the invention. Therefore, the above-mentioned detailed description must be considered only for illustrative purposes instead of restrictive purposes. The scope of the present invention must be decided by a rational analysis of claims, and all modifications within equivalent ranges of the present invention are contained in the scope of the present invention.

INDUSTRIAL APPLICABILITY

As apparent from the above description, although the above-mentioned method and apparatus for transmitting and receiving a signal of a relay node in a wireless communication system have been disclosed on the basis of application examples for the 3GPP LTE system, the inventive concept of the present invention is applicable not only to the 3GPP LTE system, but also to other mobile communication systems.

It will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The invention claimed is:

1. A method for transmitting and receiving a signal at a relay node in a wireless communication system, the method comprising:
    transmitting and receiving a relay-user equipment (UE) link signal through a relay access subframe;
    switching a communication link from a relay-UE link to a relay-base station (BS) link during a predetermined time; and
    transmitting and receiving a relay-BS link signal through a backhaul subframe,
    wherein, if a propagation delay is present in the relay-BS link, then:
        a timing edge of the relay access subframe is configured to have an offset value with respect to an uplink subframe of the backhaul subframe in order that the timing edge of the relay access subframe is located ahead of the uplink subframe of the backhaul subframe by the offset value,
        the uplink subframe edge of the backhaul subframe is located ahead of the timing edge of a reference subframe edge by the symbol length corresponding to the propagation delay,
        a downlink subframe edge of the backhaul subframe is located behind the timing edge of a reference subframe edge by the symbol length corresponding to the propagation delay, and
        the timing edge of the backhaul subframe corresponds to a starting timing of a first symbol of the backhaul subframe, and an index of the first symbol is 0.

2. The method according to claim 1, wherein a timing edge of an uplink subframe of the relay access subframe is identical to a timing edge of a downlink subframe of the relay access subframe.

3. The method according to claim 2, wherein:
    if a propagation delay is present in the relay-BS link, a downlink subframe edge of the backhaul subframe is delayed from the timing edge of the reference subframe by a symbol length corresponding to the propagation delay.

4. The method according to claim 1, wherein the offset value is a ½ symbol.

5. The method according to claim 1, wherein a shortened physical uplink control channel (PUCCH) format in which one symbol is punctured in the uplink subframe from among the backhaul subframe is used.

6. A relay device for use in a wireless communication system, the relay device comprising:
    a transceiver configured to transmit and receive a relay-user equipment (UE) link signal through a relay access subframe, or transmit and receive a relay-base station (BS) link signal through a backhaul subframe; and
    a processor configured to switch a communication link from a relay-UE link to a relay-base station (BS) link during a predetermined time,
    wherein, if a propagation delay is present in the relay-BS link, then:
        a timing edge of the relay access subframe is configured to have an offset value with respect to an uplink subframe of the backhaul subframe in order that the timing edge of the relay access subframe is located ahead of the uplink subframe of the backhaul subframe by the offset value,
        the uplink subframe edge of the backhaul subframe is located ahead of the timing edge of a reference subframe edge by the symbol length corresponding to the propagation delay,
        a downlink subframe edge of the backhaul subframe is located behind the timing edge of a reference subframe edge by the symbol length corresponding to the propagation delay, and
        the timing edge of the backhaul subframe corresponds to a starting timing of a first symbol of the backhaul subframe, and an index of the first symbol is 0.

7. The relay device according to claim 6, wherein a timing edge of an uplink subframe of the relay access subframe is identical to a timing edge of a downlink subframe of the relay access subframe.

8. The relay device according to claim 7, wherein:
if a propagation delay is present in the relay-BS link, a downlink subframe edge of the backhaul subframe is delayed from the timing edge of the reference subframe by a symbol length corresponding to the propagation delay.

9. The relay device according to claim 8, wherein the timing edge of the uplink subframe of the relay access subframe and the timing edge of the downlink subframe of the relay access subframe is located ahead of the timing edge of the uplink subframe of the backhaul subframe.

10. The relay device according to claim 6, wherein the offset value is a ½ symbol.

\* \* \* \* \*